US012641069B1

(12) United States Patent
Cohen et al.

(10) Patent No.: US 12,641,069 B1
(45) Date of Patent: May 26, 2026

(54) DECENTRALIZED CREDENTIAL GATING

(71) Applicant: Block, Inc., San Francisco, CA (US)

(72) Inventors: Gabriel Cohen, Oakland, CA (US);
Daniel Buchner, Austin, TX (US)

(73) Assignee: Block, Inc., Oakland, CA (US)

( * ) Notice: Subject to any disclaimer, the term of this patent is extended or adjusted under 35 U.S.C. 154(b) by 233 days.

(21) Appl. No.: 18/216,050

(22) Filed: Jun. 29, 2023

(51) Int. Cl.
*H04L 9/40* (2022.01)
*G06F 21/45* (2013.01)
*H04L 9/32* (2006.01)

(52) U.S. Cl.
CPC .......... *H04L 63/0807* (2013.01); *G06F 21/45* (2013.01); *H04L 9/3213* (2013.01)

(58) Field of Classification Search
CPC .... H04L 63/0807; H04L 9/3213; G06F 21/45
See application file for complete search history.

(56) References Cited

U.S. PATENT DOCUMENTS

| | | | | |
|---|---|---|---|---|
| 2019/0222424 | A1* | 7/2019 | Lindemann | ........... H04L 9/3231 |
| 2020/0026834 | A1* | 1/2020 | Vimadalal | ............ H04L 9/0825 |
| 2020/0053090 | A1* | 2/2020 | Kliger | ................... H04L 63/107 |
| 2020/0374132 | A1* | 11/2020 | Lobban | ................. G06Q 10/00 |
| 2023/0050460 | A1* | 2/2023 | Cameron | ............. H04L 9/3247 |
| 2023/0129276 | A1* | 4/2023 | Satake | ................ G06F 21/6218 |
| | | | | 726/26 |
| 2023/0179588 | A1* | 6/2023 | Murdoch | ................ G06F 21/64 |
| | | | | 726/4 |
| 2023/0319039 | A1* | 10/2023 | Murdoch | ........... H04L 63/0884 |
| | | | | 726/9 |
| 2024/0273542 | A1* | 8/2024 | Rojas | ..................... G06Q 20/02 |
| 2024/0283649 | A1* | 8/2024 | Richter | ................ H04L 9/3297 |

OTHER PUBLICATIONS

Zhong, Tao; Chang, Junsheng; Shi, Peichang; Li, Linhui; Gao, Fei; "Dyacon: JointCloud Dynamic Access Control Model of Data Security Based on Verifiable Credentials," ISPA/BDCloud/SocialCom/SustainCom, IEEE International Conference, Sep. 30-Oct. 3, 2021, pp. 336-343.*

Li, Yunliang; Fu, Yanfang; Du, Zhiqiang; Cai, Zhipeng; "An Access Control Scheme Based on Decentralized Identifiers and Verifiable Credentials in IoT," 3rd International Conference on Computer Science and Management Technology (ICCSMT), IEEE, Shanghai, China, Nov. 18-20, 2022, pp. 279-283.*

* cited by examiner

*Primary Examiner* — Victor Lesniewski
(74) *Attorney, Agent, or Firm* — IP Spring

(57) ABSTRACT

Gating logic is described to control access based on verifiable credentials. The gating logic is employable in a variety of ways to leverage verifiable credentials in support of identity, qualifications, or other attributes of an entity, and may do so without exposing personal information. To do so, a software development kit is described in one or more examples that is configured to incorporate gating logic at a service provider system to leverage use of verifiable credentials.

20 Claims, 14 Drawing Sheets

300

Figure 4:
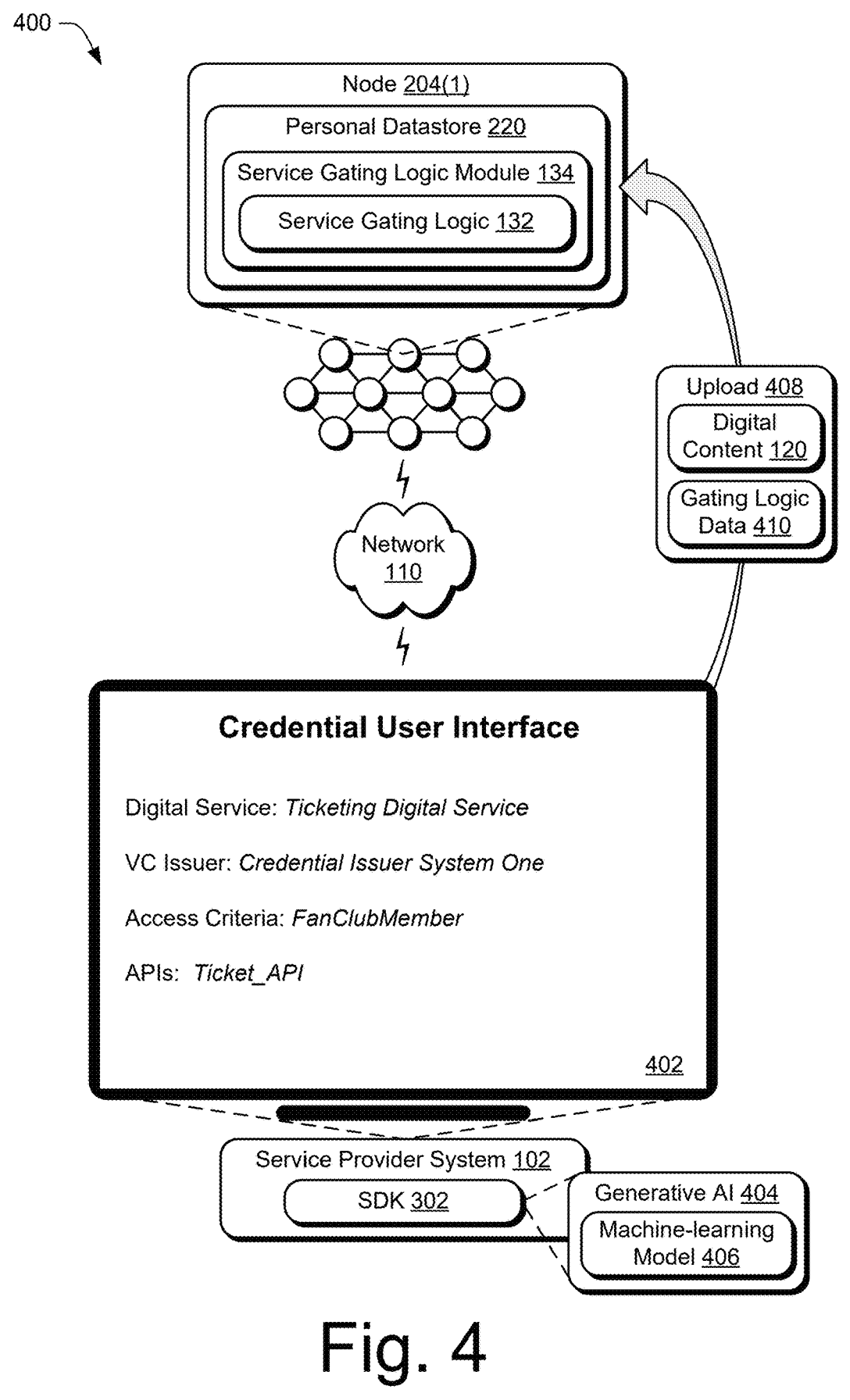

400

Node 204(1)

Personal Datastore 220

Service Gating Logic Module 134

Service Gating Logic 132

Upload 408

Digital Content 120

Gating Logic Data 410

Network 110

Credential User Interface

Digital Service: *Ticketing Digital Service*

VC Issuer: *Credential Issuer System One*

Access Criteria: *FanClubMember*

APIs: *Ticket_API*

402

Service Provider System 102

SDK 302

Generative AI 404

Machine-learning Model 406

Node 204(1)

Node Manager Module 206(1)

Personal Datastore 220

Digital Content 120

Service Gating Logic Module 134

Service Gating Logic 132

Rules 506(1)    Rules 506(2)   [•••]   Rules 506(N)

Personal Datastore Interface 502

API 504(1)    API 504(2)   [•••]   API 504(N)

202

Verifiable Credential 130

Network 110

108

Client Device 106

Application 118

600

Credential User Interface

VC: *Employment Verification*

VC Issuer: *Credential Issuer System One*

VC Type: *Employment*

VC Consent to access:  *All employment APIs*

608

Client Device 106

Application 118

Client Gating
Logic Module 138

Client Gating
Logic 136

Verifiable
Credential 130

Machine-learning
Model 610

606

108

Client Gating
Logic Data 602

Rules 604

800

Credential User Interface

Share "Employment Verification" Credential with Professional Conference?

Yes 804     No 806

802

Client Device 106

Application 118

Client Gating Logic Module 138

Client Gating Logic 136

Machine-learning Model 808

Verifiable Credential 130

108

900

1000 ⟍

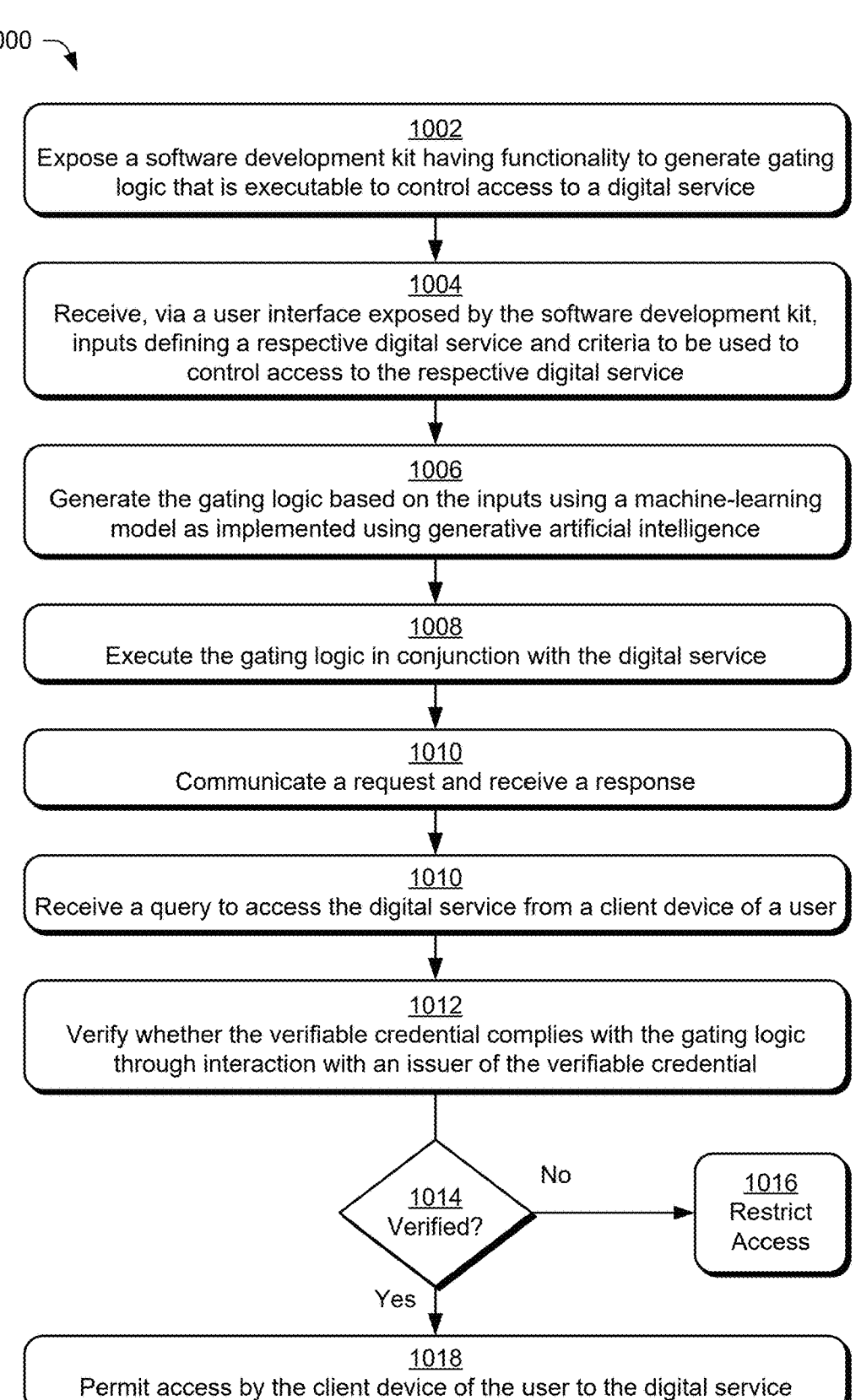

1002
Expose a software development kit having functionality to generate gating logic that is executable to control access to a digital service 1004
Receive, via a user interface exposed by the software development kit, inputs defining a respective digital service and criteria to be used to control access to the respective digital service 1006
Generate the gating logic based on the inputs using a machine-learning model as implemented using generative artificial intelligence 1008
Execute the gating logic in conjunction with the digital service 1010
Communicate a request and receive a response 1010
Receive a query to access the digital service from a client device of a user 1012
Verify whether the verifiable credential complies with the gating logic through interaction with an issuer of the verifiable credential 1014
Verified?

No → 1016
Restrict Access

Yes

1018
Permit access by the client device of the user to the digital service

Fig. 10

1100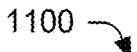

1102
Detect a request in a header of a webpage, the request for a verifiable credential to obtain access to the webpage

1104
Identifying, through execution of gating logic by the processing device automatically and without user intervention, which verifiable identifier of a plurality of verifiable credentials is referenced in the request

1106
Determine, through local execution of the gating logic by the processing device, that access to the verifiable credential is permitted

1108
Permitted?

No → 1110 Restrict Access

Yes

1112
Communicate the verifiable credential responsive to the determining

1114
Receive access to the webpage responsive to successful verification of the verifiable credential

Merchant Platform 1210

P2P Platform 1212

Media Content Platform 1214

1216

1202

1204

1206

1208

Application Programming Interfaces 1218

1222

1206(A)

POS Application 1220

1224

1206(B)

Payment Application 1226

1206(C)

Payment Application 1226

1206(D)

Listener Application 1228

1206(E)

Artist Application 1230

1400

DECENTRALIZED CREDENTIAL GATING

TECHNICAL FIELD

Decentralized networks provide a variety of functionalities in connection with implementing and securely transferring various digital assets, examples of which include cryptocurrencies and cryptographic-based tokens. Additional functionalities have been developed that leverage decentralized networks, examples of which include use of decentralized identifiers (DIDs) and verifiable credentials (VCs).

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 4 is a non-limiting illustration of an example system that is operable to implement use of a software development kit to generate an upload of digital content and gating logic data to a personal datastore of a node of a decentralized network as described herein according to an implementation of the present subject matter

FIG. 10 is a flow diagram depicting a step-by-step procedure in an example implementation of operations performable by a processing device for accomplishing a result in which access is granted to a digital service through verification of verified credentials as controlled by gating logic implemented using a software development kit.

FIG. 11 is a flow diagram depicting a step-by-step procedure in an example implementation of operations performable by a processing device for accomplishing a result in which access to a webpage is received responsive to successful verification of a verifiable credential as indicated by a header of the webpage by executing gating logic implementing an intelligent assistant.

DETAILED DESCRIPTION

Overview

Figure 1:
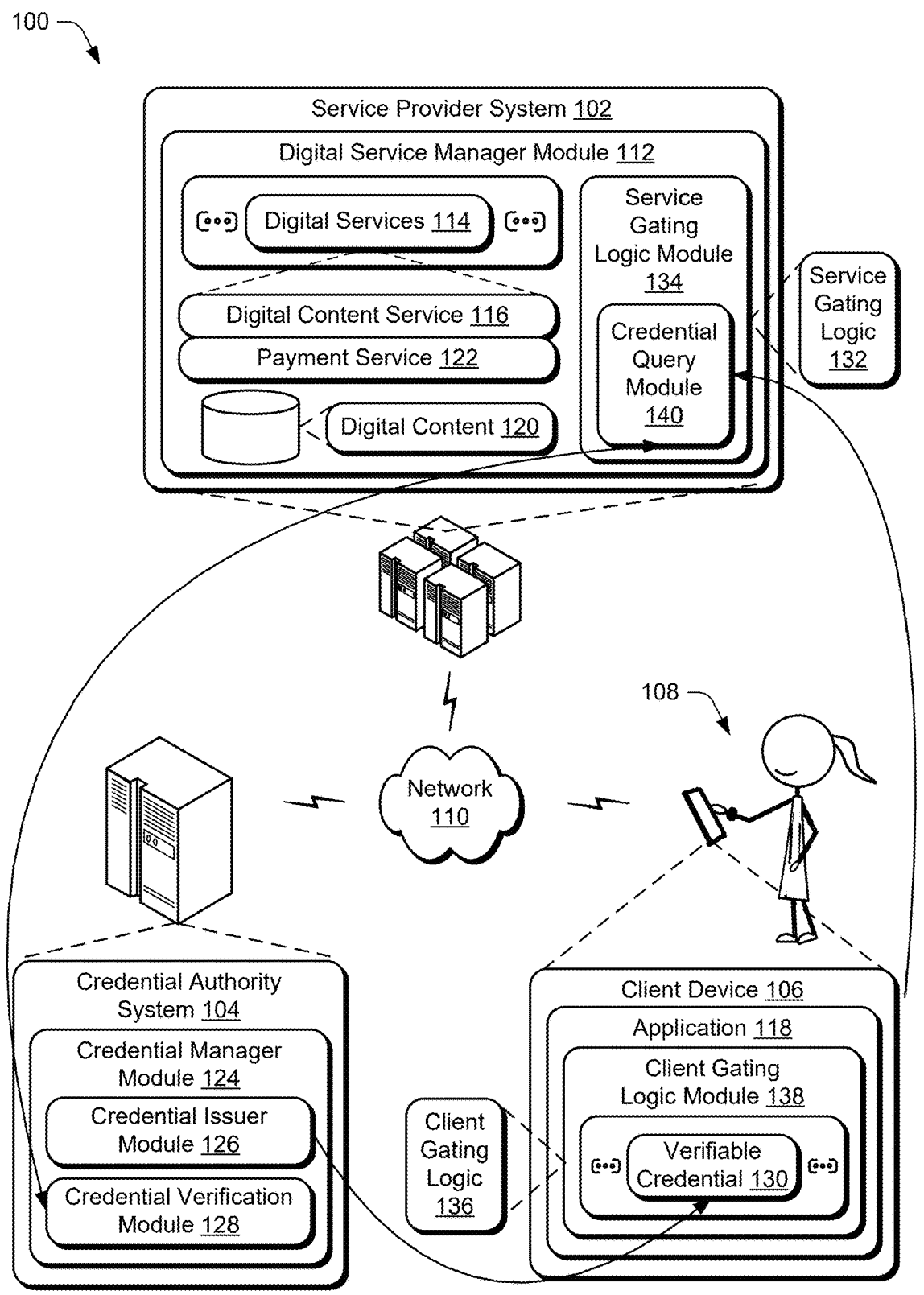
FIG. 1 is a block diagram depicting a non-limiting example system configurable to implement decentralized credential gating techniques as described herein according to an implementation of the present subject matter.

Decentralized identifiers (DIDs) are a mechanism to control an entity's digital identity in a decentralized environment. Typically, an entity has free reign over the use of a corresponding decentralized identifier, what information is stored in association with the decentralized identifier, how the decentralized identifier is used for interaction with other entities, and so on.

Verifiable credentials (VCs) are standardized digital representations of assertions and attestations made about a subject. Verifiable credentials, for instance, support an ability to prove assertions made with respect to an entity associated with the decentralized identifier, e.g., to control data access.

Conventional techniques that employ verifiable credentials do not support an efficient mechanism for verifiers to authenticate the credentials, e.g., due to spam, identity proofing, and so forth. There are several operations involved in verification of a credential, including cryptographic verification, issue verification, revocation checking, trust framework verification, and attribute verification. Implementation of these operations is challenging in real-world scenarios to initiate and maintain, and therefore is conventionally limited to sophisticated entities having advanced computational knowledge and access to significant amounts of computational resources.

A verifier, for instance, is tasked with a multitude of operations involved in verifying authenticity of a verifiable credential. Examples of these operations include evaluating whether a verifiable credential is valid, whether the signature is valid, whether data forming the verifiable credential is compliant with the latest verifiable credential data model, whether the data is conformant with a particular data schema or credential type, whether the credential originates from a trusted issuer, whether the credential has expired, whether the credential has a valid status (e.g., is not revoked), whether the holder has proof of control (e.g., as presented with a signature from the credential subject), and so forth.

Incorrect implementation of these multitude of operations may expose digital content and digital services that rely on a verifiable credential to compromise by malicious parties. If a verifiable credential is invalid, expired, or untrustworthy and not correctly interpreted by a verifier, the holder of the verifiable credential may gain access to sensitive information or content whether the verifiable credential is held by an authentic or malicious party. Without accurate verification of the verifiable credentials, secure information is also at risk in conventional systems. On the other hand, if a valid verifiable credential is incorrectly interpreted by a verifier, an authorized holder of the verifiable credential may be locked out of or otherwise restricted from access to information or content, thereby causing delays, user frustration, and inefficient use of computational resources.

To address these technical challenges, gating logic is employed to control access based on verifiable credentials. The gating logic is employable in a variety of ways (e.g., client and/or server side) to leverage verifiable credentials in support of identity, qualifications, or other attributes of an entity, and may do so without exposing personal information. To do so, a software development kit is described in one or more examples that is configured to incorporate gating logic at a service provider system to leverage use of verifiable credentials, e.g., to control access to digital services and digital content of the service provider system.

A credential authority system or other system, for instance, exposes functionality to a third-party service provider system to implement gating logic. The credential authority system is configurable to generate credentials directly and/or leverage and manage use of credentials generated by another system.

The credential authority system surfaces a software development kit (SDK) that is usable by a third-party service provider system to implement the gating logic locally as part of a software stack and/or remotely at a decentralized node. A user interface, for instance, is exposed through the SDK to specify criteria of the gating logic. Generative artificial intelligence (AI) techniques are also usable to specify access rules and criteria as formatting the gating logic based on inputs received via the user interface output by the SDK. The gating logic, once deployed, is then employed to leverage verifiable credentials in control of access to digital services, digital content made available by those services, and so on.

Some categories of credential data may involve additional authorization operations that may also be specified through interaction with the SDK and/or generated using the generative AI techniques. For static credential data, for instance, the gating logic may be further configured to verify with an issuer of the verifiable credential as to whether the credential data is expired for the holder of the verifiable credential. For dynamic credential data, the gating logic is executable to verify with the issuer if the credential data is revoked. Further verification may involve sending a message to the issuer and withholding access to the resource until a response is received.

Verification of the credentials by the gating logic is also exposable by the credential authority system (e.g., directly or indirectly as described above) in a software-as-a-service scenario for access by third-party service party systems, e.g., with a corresponding collection of fees. Verification queries, for instance, are routed by the gating logic developed through use of the SDK and executed at a service provider system to the credential authority system. A result of the verification is then returned to the third-party service provider system to control access. Verification is performable directly at a local intelligent agent or remotely at a decentralized node.

In another hosting example, a service provider system implements a personal datastore for use by potential clients through associated client devices. Accordingly, in this example the SDK is executed to implement specific APIs for access to the service provider system to generate the personal datastore. To control access to these APIs and protect against abuse and security threats from the potential clients, the service provider system implements gating logic to ensure that specified credentials are met as part of signup by the potential clients, e.g., associated with a particular business entity. Accordingly, during signup to generate the personal datastore, the gating logic is executed to generate a query for the verifiable credentials. An intelligent agent implemented on the client side of the potential clients is used to provide the verifiable credentials, automatically and without user intervention in response to the query. In one or more examples, the verifiable credentials are signed by a decentralized identifier (DID) of the potential clients to confirm the verifiable credentials. Once verified, access to the digital service is permitted, e.g., to generate the personal datastore.

Gating logic is also employable at a client side in one or more examples by an application to control access to verifiable credentials of an entity associated with the client device, e.g., a user. Gating logic as executed at a client side, for instance, is usable to implement an intelligent assistant to manage entry of verifiable credentials and how access to the verifiable credentials is permitted. A client device, for instance, downloads an application having functionality similar to a software development kit as described above to surface a user interface to enter verifiable credentials and define access rules controlling exposure of the verifiable credentials.

In one or more implementations, generative artificial intelligence (AI) techniques are also supported, e.g., to generate the access rules as gating logic based on plain-language inputs received via the user interface. The gating logic, for instance, is executable to implement a gating logic assistant that may operate "behind the scenes" to improve efficiency in access to digital services by automatically providing respective verifiable credentials. Additionally, access to the verifiable credentials may be signed by a decentralized identifier using the gating logic to further verify the entity "is who they say they are" as part of verification of the verifiable credentials. Execution of the gating logic as part of the application at the client device supports a wide variety of functionalities.

For example, a conventional technique used for verification that an entity attempting to gain access to a resource as "not a machine" is a Captcha verification. Some implementations of Captcha rely upon a user text input to match an image of distorted text or user input to select images having a specific object. However, security of these conventional systems for human verification has diminished due to advances in object and text recognition techniques. Recent versions of "not a machine" verification (e.g., "reCAPTCHA") involve monitoring human interaction with computing devices and/or requesting a user input to click a control in a user interface to verify human presence. Similarly, these conventional techniques also present security risks due to advances in human behavioral mimicry by machines. Further, these conventional techniques interrupt access to resources for those users who have access privileges to such resources, causing frustration and increasing network traffic for numerous authentication exchanges, especially with image-based verification. To address these challenges, gating logic is executed by a client device to implement an intelligent agent that is usable to automatically answer a "not a machine" using verifiable credentials "behind the scenes"

without interrupting a user's navigation through various websites and with decreased network traffic than conventional authentication.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Decentralized Credential Gating Environment

FIG. 1 is a block diagram depicting a non-limiting example system 100 configurable to implement decentralized credential gating techniques as described herein according to an implementation of the present subject matter. This example system 100 includes a service provider system 102, a credential authority system 104, and a client device 106 (e.g., associated with an entity 108) that are communicatively coupled, one to another, via a network 110.

Computing devices that implement the system 100 are configurable in a variety of ways. A computing device, for instance, is configurable as a server, a desktop computer, a laptop computer, a mobile device (e.g., assuming a handheld configuration such as a tablet or mobile phone), an IoT device, a wearable device (e.g., a smart watch), an AR/VR device, and so forth. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud" as further described below.

The service provider system 102 includes a digital service manager module 112 that represents functionality usable to implement and manage operation of digital services 114. Digital services 114 are accessible remotely over the network 110 in the illustrated example by the client device 106 using an application 118, e.g., a network-enabled application, plugin module, browser, and so forth. The service provider system 102, as implementing a network platform, implements the digital services 114 through execution of software by respective servers or other hardware devices.

Digital services 114 are configurable to support a wide variety of functionalities. Digital services 114, for instance, support a digital content service 116 that is used to manage and control output of digital content 120 illustrated as maintained in a storage device. Examples of digital content 120 include digital images, webpages, digital music, digital videos, social media posts, and so forth. The digital services 114 are also configurable to implement a payment service 122 and the digital content 120 involves transaction data utilized as part of the payment service 122. The payment service 122, for instance, supports person-to-person transactions and payment processing.

An additional example of a digital service 114 (and functionality included as part of implementing the digital services) includes a search service. In one or more examples, the search service is usable to locate particular items of digital content 120 based on a search query. The search service, for instance, is configurable to support functionality to directly locate items of digital content 120. The search service is also configurable in support of other digital services. A recommendation engine, for instance, is implemented by the search service to generate a search result as content-based recommendations of items of digital content 120, e.g., based on a user's past behavior and exhibited preferences, use of collaborative filtering, implemented to hybrid recommendations, and so forth.

The credential authority system 104 is illustrated as including a credential manager module 124. The credential manager module 124 includes a credential issuer module 126 and a credential verification module 128. The credential issuer module 126 is representative of functionality to issue verifiable credentials 130. The credential verification module 128 is configured to verify authenticity of the verifiable credentials 130.

The verifiable credential(s) 130 are usable to validate a claim made by a corresponding entity. The verifiable credentials 130, for instance, are generated by the credential issuer module 126 to include a cryptographic proof. The cryptographic proof is then usable by the credential verification module 128 to verify authenticity of the verifiable credential 130 using one or more cryptographic keys.

The verifiable credentials 130 are configurable to support standardization of qualifications, affiliations, privileges, or other claims about or made by a corresponding entity. Accordingly, entity 108 in the illustrated examples acts as a subject of the verifiable credentials and the verifiable credentials support an assertion made by the entity.

Accordingly, a verifiable credential is an open standard for digital credentials that can represent physical credentials (passport or driver's license), or other things that do not have a physical equivalent, such as a bank account. When acting as an issuer, the credential authority system 104 generates a credential, and the verifiable credential 130 is then given to the holder (e.g., entity 108) who can store it on the client device 106 for later use. The holder of the verifiable credential 130 can then prove something about themselves by presenting the verifiable credential 130, e.g., to a service provider system 102 to access digital content 120 made available via the digital services 114.

As previously described, however, conventional techniques that are configured to leverage use of a verifiable credential do not support an efficient mechanism for verifiers to authenticate the verifiable credential, e.g., due to spam, identity proofing, and so forth. A multitude of operations, for example, are involved in verifying authenticity of a verifiable credential. Examples of these operations include evaluating whether a verifiable credential is valid, whether the signature is valid, whether data forming the verifiable credential is compliant with the latest verifiable credential data model, whether the data is conformant with a particular data schema or credential type, whether the credential originates from a trusted issuer, whether the credential has expired, whether the credential has a valid status (e.g., is not revoked), whether the holder has proof of control (e.g., as presented with a signature from the credential subject), and so forth.

Incorrect implementation of these multitude of operations may expose digital content and digital services that rely on a verifiable credential to potential compromise by malicious parties. If a verifiable credential is invalid, expired, or untrustworthy and not correctly interpreted, the holder of the verifiable credential may gain access to sensitive information or content whether the verifiable credential is held by an authentic or malicious party. Accordingly, without accurate verification of the verifiable credentials, secure information is also at risk in conventional systems.

On the other hand, if a verifiable credential is incorrectly interpreted as invalid, an authorized holder of the verifiable credential may be locked out or otherwise restricted from access to information or content, thereby causing delays, user frustration, and inefficient use of computational resources. In this way, implementation of these operations is challenging in real-world scenarios to initiate and maintain, and therefore is conventionally limited to sophisticated entities having advanced computational knowledge and access to significant amounts of computational resources.

To address these technical challenges, gating logic is employed to control access based on the verifiable credential 130 as well as "who" can access the verifiable credential. As such, the gating logic is employable in a variety of ways in the system 100.

In a first illustrated example, service gating logic 132 is employed at a service gating logic module 134 to control access to digital services 114 and digital content 120 made available via the digital services 114, i.e., "at the server side." In a second illustrated example, client gating logic 136 is employed at a client gating logic module 138 as implemented as part of execution of an application 118 at the client device 106 to control access to the verifiable credential 130.

As illustrated in FIG. 1, the credential issuer module 126 of the credential authority system 104 issues the verifiable credential 130 to the entity 108. The entity 108 then stores the verifiable credential 130 at the client device 106. The client gating logic module 138 is utilized to control whether to expose the verifiable credential 130, e.g., as an "intelligent assistant." The client gating logic 136 is configurable using a collection of access rules to control who may receive the verifiable credential 130 "behind the scenes" automatically and without user intervention. Options are also contemplated to verify provision of the verifiable credential 130, e.g., that relate to sensitive information such as a social security number.

The application 118, for instance, is configurable as a browser that implements the client gating logic module 138 as a plugin module to control output of the verifiable credential 130, e.g., to the service gating logic module 134 to access the digital services 114. Continuing with the illustrated example, the client gating logic 136 is executed by the client gating logic module 138 to permit access to the verifiable credential 130, which is communicated to the service gating logic module 134. The service gating logic module 134 is then tasked with verifying the verifiable credential 130, which is used as a basis to control access to the digital services 114.

A credential query module 140, for example, communicates the verifiable credential 130 from the service provider system 102 over the network 110 to the credential verification module 128 of the credential authority system 104. The credential verification module 128 verifies authenticity of the credential (e.g., using a cryptographic key), a result of which is then returned to the service gating logic module 134. In this way, the credential authority system 104 acts as a third-party service to the service provider system 102 to support verification of the verifiable credential 130 as part of controlling access to the digital services 114.

The service gating logic 132 is implemented in a variety of ways, such as locally as part of the service provider system 102 as illustrated in FIG. 1. In another example, the service gating logic 132 is implemented to control remote access to digital content of the service provider system 102 in a decentralized platform, an example of which is described in the following discussion and shown in a corresponding figure.

Figure 2:
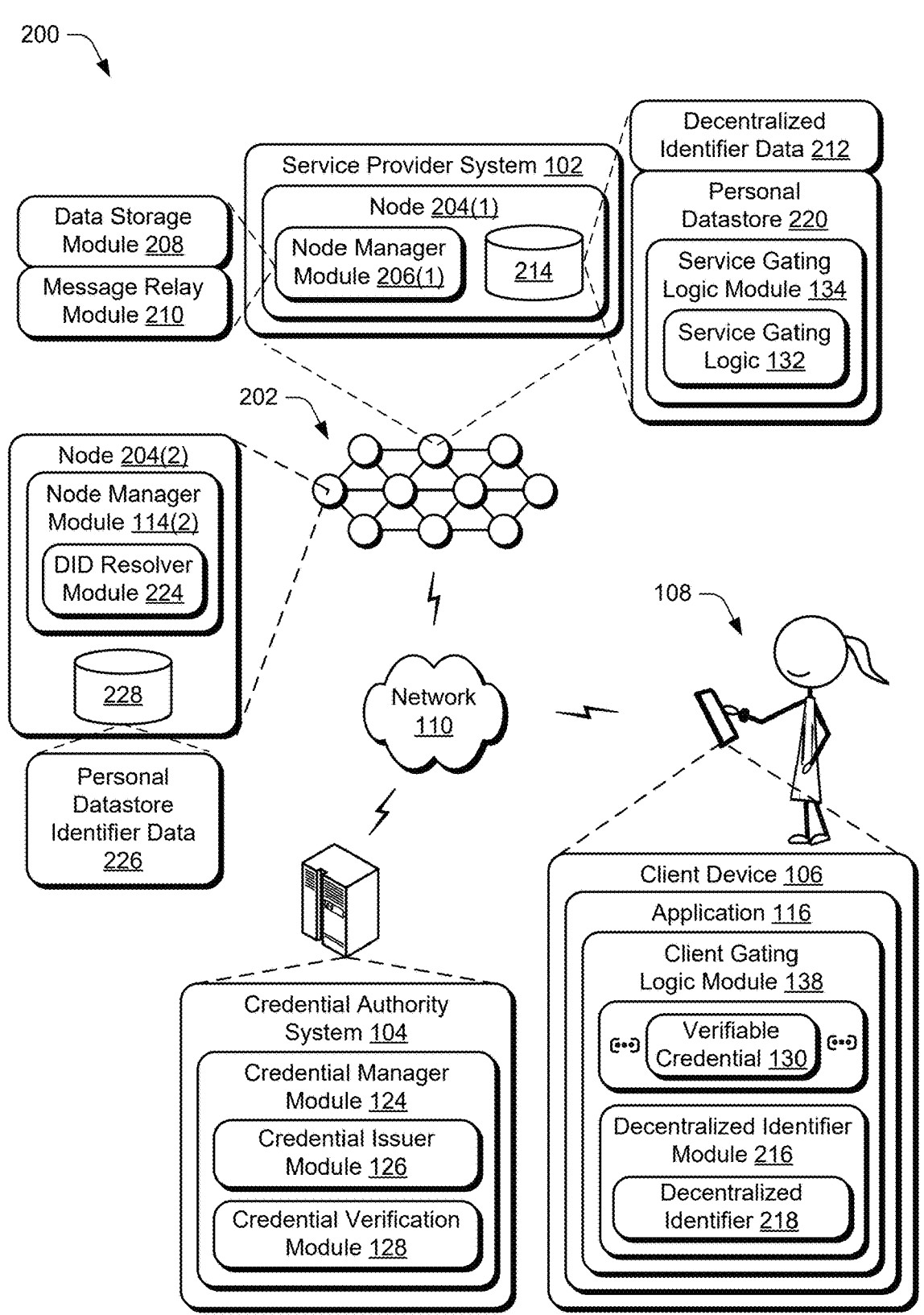
FIG. 2 is a non-limiting illustration of an example system showing operation of decentralized credential gating techniques in greater detail as described herein according to an implementation of the present subject matter.

FIG. 2 is a non-limiting illustration of an example system 200 that is operable to implement decentralized credential gating techniques in a decentralized network as described herein according to an implementation of the present subject matter. The illustrated system 200 includes a decentralized platform 202 implemented using a plurality of nodes (also referred to as "web nodes" and "decentralized nodes"), examples of which are illustrated as node 204(1) and node 204(2). The nodes 204(1), 204(2) are representative of a computer or other device involved in implementation of a decentralized network, e.g., tasked with validating transactions and maintaining a copy of a blockchain ledger. The system 100 also includes the credential authority system 104 and the client device 106.

The nodes 204(1), 204(2) include, respectively, node manager modules 206(1), 206(2) having functionality in support of communication and message relay between the nodes of the decentralized platform 202 as well as with the client device 106 and the credential authority system 104 via the network 110. Examples of functionality to do so include a data storage module 208 and a message relay module 210.

The nodes 204(1), 204(2) of the decentralized platform 202, as representative of one of a plurality of decentralized nodes (e.g., decentralized web nodes), support data storage and relays that allows entities, service provider systems, individuals, organizations and so forth to send, store, and receive encrypted or public messages and data. The nodes 204(1), 204(2) are universally addressable and are "crawlable" using data addressing in relation to the decentralized identifiers. The nodes 204(1), 204(2) are also configured to support decentralized replication of data across the nodes that is "eventually consistent" (e.g., the data is consistent across the nodes over time through continued data communication between the nodes) through communication of instances across individual nodes in the decentralized platform 202. The nodes 204(1), 204(2) supports secure encryption through use of a cryptographic key associated with an individual's decentralized identifier.

The data storage module 208 is configured to collect and maintain decentralized identifier data 212, which is illustrated as maintained in a storage device 214. The decentralized identifier data 212 is formatted to support decentralized authentication and routing as performed by the message relay module 210, e.g., for communication between nodes 204(1), 204(2) and/or with the client device 106 and credential authority system 104 via the network 110. In an implementation, the credential authority system 104 and/or the client device 106 are also implemented as nodes as part of the decentralized platform 202.

The client gating logic module 138 of the client device 106 includes a decentralized identifier module 216 that is configured to manage use of a decentralized identifier 218. Decentralized identifiers, for instance, are used to identify a respective entity through use of an identifier that is globally unique and is cryptographically verifiable. The decentralized identifier 218 is configurable through the decentralized platform 202 (e.g., using a blockchain or other distributed ledger technique implemented as part of a decentralized platform) to securely authenticate an identity of a corresponding entity.

A decentralized identifier 218 is configured as a self-owned identifier that supports decentralized authentication and routing. A self-owned identifier in a blockchain network is a unique identifier that is owned and controlled by an individual entity (e.g., on a blockchain), also referred to as a "self-sovereign identity," as contrasted with an entity controlled by a centralized authority (e.g., service provider system) that is vulnerable to attacks, hacks, and data breaches. The decentralized identifier 218 is configurable without use of subjective consensus as implemented using a conventional centralized service provider, but rather are self-generated and self-owned. Persistence of the decentralized identifier 218 is maintainable via local storage of the client device 106 and is resistant to interruption or stoppage by outside forces or authorities. The decentralized identifier 218 is also universally indexed and discoverable as part of the decentralized identifier data 212.

The verifiable credential 130 is an open standard for digital credentials that can represent physical credentials (passport or driver's license), or other things that do not have a physical equivalent, such as a bank account. The credential authority system 104 in this example that generates a credential is the issuer, and the verifiable credential 130 is then given to the holder (e.g., client device 106) who can store it for later use. The holder can prove something about themselves by presenting the credential to a verifier.

As such, the verifiable credential 130 is usable to validate a claim made by a corresponding entity, e.g., associated with a decentralized identifier 218 as described above. The verifiable credential 130, for instance, includes a cryptographic proof that is usable to validate authenticity of the credential, e.g., through communication with a credential authority system 104 that issued the verifiable credential 130 as further described in relation to FIG. 3. The verifiable credential 130 is configurable to support standardization of qualifications, affiliations, privileges, or other claims about or made by a corresponding decentralized identity.

The verifiable credential 130, as previously described, employs a data format for cryptographic presentation and verification of claims. The verifiable credential 130, for instance, supports standardized mechanisms to express and verify qualifications, privileges, and other assertions made by an entity, e.g., via a corresponding decentralized identifier. For example, the verifiable credential 130 is usable to provide a digital version of physical credentials such as a passport or driver's license. The credential issuer module 126 of the credential authority system 104 generates the verifiable credential 130 as having a cryptographic proof that is employed to verify authenticity of the verifiable credential by the credential verification module 128. An entity 108 that possesses the verifiable credential 130 may then present the credential to another entity (e.g., the service provider system 102) as proof of an assertion. The entity may then use the cryptographic proof to ensure validity of the credential, e.g., was issued by a corresponding credential authority system 104. Accordingly, a decentralized identifier 218 acts as a subject of the verifiable credential 130 that is authenticated to validate that the entity "is who they say they are" and the verifiable credential 130 supports an assertion made by the entity, either by that entity or a third-party issuer.

Node 204(1) is further configured to implement a personal datastore 220, access to which is controlled by the service gating logic module 134 through execution of the service gating logic 132. The personal datastore 220 is configured to support control by the service provider system 102 of access to the client device 106 to the digital content 120, e.g., using the decentralized identifier 218 and verifiable credential 130. The digital content 120 may be configured to store a variety of data, such as text, images, video, audio, digital documents, and so forth. In an implementation as further described below, the personal datastore 220 is also provided as a service by the service provider system 102 to third party entities, access to which is controlled using a verifiable credential 130.

Node 204(2) in the illustrated implementation includes a DID resolver module 224 that leverages personal datastore identifier data 226 maintained in a storage device 228. The DID resolver module 224 is usable to assist in resolving decentralized identifiers of the client device 106 and the service provider system 102 to locate the personal datastore 220 via the decentralized platform 202. To do so in one or more examples, the application 118 of the client device 106 parses a respective decentralized identifier of the service provider system 102 to locate a corresponding decentralized platform 202 used to implement the decentralized identifier. The decentralized identifier of the service provider system 102 is then resolved based on techniques defined for the decentralized platform 202.

The decentralized identifier module 216 of the application 118 contacts the DID resolver module 224 of the node 104(2). The DID resolver module 224 utilizes the personal datastore identifier data 226 to fetch a DID document, which is configurable as a JavaScript Object Notation (JSON) object that includes information about the decentralized identifier of the service provider system 102. This information includes public keys and service endpoints usable to locate the node 204(1) in the decentralized platform 202 corresponding to the decentralized identifier of the service provider system 102 in this example. From this information, the client device 106 locates the personal datastore 220. The service gating logic module 134 is then tasked with controlling access to the personal datastore 220 based on the service gating logic 132. The service gating logic 132 is configurable in a variety of ways, examples of which are further described below and illustrated using a corresponding figure. In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Decentralized Service Gating Logic

Figure 3:
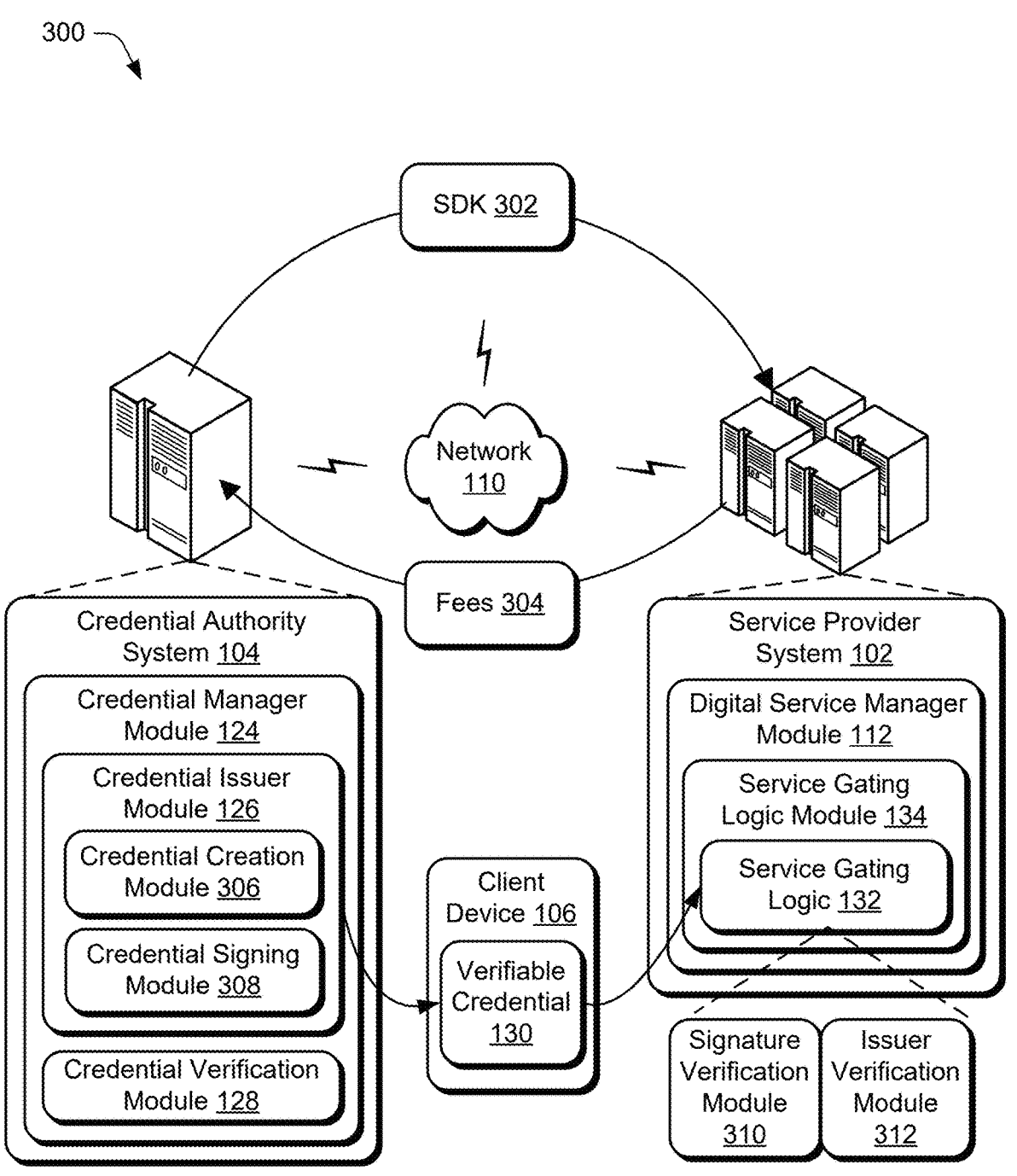
FIG. 3 is a non-limiting illustration of an example system that is operable to implement use of a software development kit to incorporate gating logic as part of a service provider system as described herein according to an implementation of the present subject matter.

FIG. 3 is a non-limiting illustration of an example system 300 that is operable to implement use of a software development kit to incorporate gating logic as part of a service provider system as described herein according to an implementation of the present subject matter. In the illustrated example, a software development kit, illustrated as SDK 302, is communicated from the credential authority system 104 to the service provider system 102. The SDK 302 is configured to implement service gating logic 132 and service gating logic module 134 as part of the digital service manager module 112 by the service provider system 102. In this example, the credential authority system 104 is configured to also issue and verify verifiable credentials that are used as a basis to form the gating logic at the service provider system 102. Other examples are also contemplated in which the SDK 302 is originated by a first party to implement gating logic that is verified using a second party.

The SDK 302 is provided to assist in generation and usage of the gating logic, e.g., the service gating logic 132 and/or the client gating logic 136. The SDK 302, for instance, includes a collection of preconfigured code that is usable to implement corresponding functionality to control which verifiable credentials are to be used to access to the digital services 114 and digital content 120, how access is to be achieved through a corresponding verifiable credential 130, and so forth.

Figure 5:
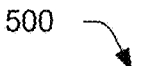
FIG. 5 is a non-limiting example showing operation of a personal datastore associated with service provider system as employing service gating logic to control exposure of digital content using respective application programming interfaces according to an implementation of the present subject matter.

The SDK 302, for example, is configurable to specify application programming interfaces having rules and protocols implemented by the service gating logic 132 to control access to the digital content 120 via the personal datastore 220 as further described in relation to FIG. 5. The SDK 302 is also configurable to include a variety of other functionalities, examples of which include development tools, integrated development environments, debuggers, implementation of a testing runtime environment, and so forth. Thus, the SDK 302 is configurable to assist in generation of the gating logic for implementation at the service provider system 102 as service gating logic 132 and/or at the client device 106 as client gating logic 136 as further described below.

Verification of the credentials by the gating logic is also exposable by the credential authority system 104 (e.g., directly or indirectly as described above) in a software-as-a-service scenario for access by the service provider system 102, e.g., with a corresponding collection of fees 304. Verification queries, for instance, are routed by the service gating logic 132 (which is developed through use of the SDK 302 and executed at a service provider system 102) to the credential authority system 104. A result of the verification is then returned to the service provider system 102 to control access. Verification is performable directly at a local intelligent agent or remotely at a decentralized node, to name a few examples.

The credential authority system 104 as previously described includes a credential manager module 124 having a credential issuer module 126 and a credential verification module 128. The credential issuer module 126 includes a credential creation module 306 that is executable to create the verifiable credential 130 and a credential signing module 308 that is executable to sign the verifiable credential 130, e.g., using a cryptographic key of the credential authority system 104.

The credential creation module 306, for instance, verifies an identity of an entity that is to be a holder of the verifiable credential 130, e.g., using a decentralized identifier, through manual investigation of other credentials, and so forth. The credential creation module 306 also receives as an input a "claim" that is to be attested to by the verifiable credential 130, e.g., employment status, educational status, fan club membership, access to a person-to-person payment platform, and so forth. Once the identity is verified, the credential creation module 306 creates the verifiable credential 130 which identifies the claim and is signed using the credential signing module 308. The credential signing module 308, for instance, employs a cryptographic signature that is unique to the claim being made as part of the credential and a private cryptographic key associated with the credential authority system 104. The verifiable credential 130 is then sent to a holder of the credential, e.g., to a client device 106 associated with the entity 108.

Service gating logic 132 at the service provider system 102 may then receive the verifiable credential 130 from the client device 106, e.g., to access the digital content 120 made available by the digital services 114. The service gating logic 132 of the service provider system 102 is then employed to verify the verifiable credential 130, examples of functionality to do so include a signature verification module 310 and an issuer verification module 312.

To do so, the service gating logic 132 communicates the verifiable credential 130 to the credential verification module 128, e.g., the credential and a proof which indicates that the client device 106 holds the verifiable credential 130 which is performable by signing the request using the decentralized identifier 218 associated with the client device 106. The credential verification module 128 then checks the cryptographic signature on the verifiable credential 130 using a cryptographic key associated with the credential authority system 104, e.g., a public key associated with the credential authority system 104. A result of which is returned to the signature verification module 310, which verifies that the verifiable credential 130 is issued by the credential authority system 104 and tampering has not occurred.

The issuer verification module 312 is also configurable to verify the credential authority system 104 as the issuer. The issuer verification module 312, for instance, obtains a cryptographic key associated with the credential authority system 104 (e.g., a public key) from a trusted source, examples of which include a blockchain, public key registry, and so forth. In this way, the issuer verification module 312 confirms the public key associated with the credential authority system 104 is legitimate and belongs to the credential authority system 104. Additional criteria may also be employed by the service gating logic 132 as part of verifying the verifiable credential 130, e.g., to check whether the verifiable credential 130 is current, has not been revoked, and so forth. Once verified, the service gating logic module 134 is configured to accept the claim made by the verifiable credential 130, which is then usable to control access to the digital services 114 as specified by the service gating logic 132.

FIG. 4 is a non-limiting illustration of an example system 400 that is operable to implement use of a software development kit to generate an upload of digital content and gating logic data to a personal datastore of a node of a decentralized network as described herein according to an implementation of the present subject matter. The credential authority system 104 as described in FIG. 3 surfaces the SDK 302 that is executable by the service provider system 102 to implement the gating logic locally as part of a software stack and/or remotely at a decentralized node as shown in FIG. 2.

A user interface 402, for instance, is exposed through the SDK 302 to specify criteria of the gating logic. In the illustrated example, the SDK 302 includes options to specify a particular digital service 114 that is a subject of the access control rule, a verifiable credential issuer of a verifiable credential to be used to control the access, access criteria associated with successful or unsuccessful verification of the verifiable credential 130 (i.e., the actions to be performed), and one or more application programming interfaces that are used to provide this access as further described in relation to FIG. 5. Generative AI 404 techniques are also usable as implemented by a respective machine-learning model 406 to specify access rules and criteria as formatting the gating logic based on inputs received via the user interface 402 output by the SDK 302.

Some categories of credential data may involve additional authorization operations that may also be specified through interaction with the SDK and/or generated using the generative AI techniques. For static credential data, for instance, gating logic may be further configured to verify with an issuer of the verifiable credential as to whether the credential data is expired for the holder of the verifiable credential. For dynamic credential data, the gating logic is executable to verify with the issuer if the credential data is revoked. Further verification may involve sending a message to the issuer and withholding access to the resource until a response is received.

The SDK 302 in the illustrated example generates an upload 408 including digital content 120 and gating logic data 410. The gating logic data 410 defines configuration of the service gating logic 132 to be used to access the digital content 120 via the personal datastore 220.

In another hosting example, the service provider system 102 implements the personal datastore 220 for use by a potential client (e.g., entity 108) through an associated client device 106. Accordingly, in this example the SDK 302 is executed to implement specific APIs for access to the service provider system 102 to generate the personal datastore 220. To control access to these APIs and protect against abuse and security threats from the potential clients, the service provider system 102 implements the service gating logic 132 to ensure that specified verifiable credentials are met as part of signup by the potential clients, e.g., associated with a particular business entity.

Accordingly, during signup by the entity 108 to generate the personal datastore 220 by the service provider system 102, the service gating logic 132 is executed to generate a query for the verifiable credential 130. An intelligent agent, as further described below, may also be implemented on the client side to provide the verifiable credentials, automatically and without user intervention in response to the query. In one or more examples, the verifiable credential 130 is signed by a decentralized identifier 218 of the entity 108 to further confirm the verifiable credential 130. Once verified, access to the digital service 114 as executed by the service provider system 102 is permitted, e.g., to generate the personal datastore 220. In this way, the service provider system 102 protects again abuse by malicious parties.

FIG. 5 is a non-limiting example 500 showing operation of a personal datastore 220 associated with service provider system 102 as employing service gating logic 132 to control exposure of digital content 120 using respective application programming interfaces according to an implementation of the present subject matter. The personal datastore 220 in this example includes a personal datastore interface 502 and service gating logic 132 as implemented by a service gating logic module 134. The personal datastore interface 502 includes a plurality of application programming interfaces (APIs), examples of which are illustrated as API 504(1), API 504(2), . . . , API 504(N).

Each of these APIs has associated rules 506(1), 506(2), . . . , 506(N) implemented as part of the service gating logic 132 to control access to respective portions of the digital content 120. Through use of the different APIs 504(1)-504(N), access is provided to different items and portions of the digital content 120 to different entities and associated devices. The APIs 504(1)-504(N) are configurable in a variety of ways, such as uniform resource locators (URLs), uniform resource identifiers (URIs), through use of decentralized identifiers, and so forth.

The verifiable credential 130 is used as a basis by the service gating logic module 134 to control access to the digital content 120 in the personal datastore 220. As previously described, the verifiable credential 130 is usable to validate a claim made by an entity 108, which is this example is usable to control access to respective APIs

504(1)-504(N) of the personal datastore interface 502. Accordingly, the upload 408 as implemented by the SDK 302 is usable to specify the rules 506(1)-506(N) and respective verifiable credentials, possession of which by a respective entity is usable to permit or restrict access to the digital content 120 maintained within the personal datastore 220. In this way, the service gating logic 132 is configurable to control access to the digital content 120 of the personal datastore 220 in a variety of usage scenarios. Examples of which include support of payments at a point-of-sale using assets associated with user accounts in a peer-to-peer platform, support provision of digital content 120 (e.g., as a digital content streaming service), and so on.

The rules 506(1) associated with API 504(1) for instance, may specify verifiable credentials associated with payments in a peer-to-peer payment platform to access digital content 120 associated with an asset transfer. The verifiable credentials, in one or more examples, are issued by credential issuer system to attest that an entity is a member of the platform. The verifiable credentials are then verified by the service gating logic 132 as being authentic using a cryptographic proof by the service gating logic module 134. Once validated, access to digital content 120 pertaining to the payment platform is permitted by the service gating logic 132, e.g., to access user information usable to implement the payments such as driver's license information, employment data, tax returns, and so forth. Thus, in this example the verifiable credential 130 acts as a digital authorization to then obtain additional information usable as a basis to increase a level of trust in order to perform a transaction.

The rules 506(2) associated with API 504(2) on the other hand, may specify a verifiable credential 130 associated with access to digital content 120, e.g., via digital services used to stream the digital content 120, provide the digital content 120 for download, and so forth. The verifiable credential 130, for instance, may specify membership by the entity 108 associated with the client device 106 in a digital music streaming service, memorialize purchase of digital content made available via the API 504(2), and so forth.

The gating logic is also configurable to leverage a machine-learning model to aid in control of access to the digital content 120, how digital content 120 is maintained at the personal datastore 220, and so forth. The machine-learning module, for instance, may be trained and retrained based on monitored user interaction to queue particular items of digital content 120 as made available for load balancing, which items of digital content are made available via respective APIs based on the type of digital content, and so forth. In the previous examples, gating logic is implemented at the "server side" as service gating logic 132, such as to control access to digital services 114 and digital content 120 made available by the digital services 114. The gating logic is also configurable at the "client side" to control access to the verifiable credential 130, itself, further discussion of which is described in the following examples and shown in corresponding figures.

Decentralized Client Gating Logic

Figure 6:
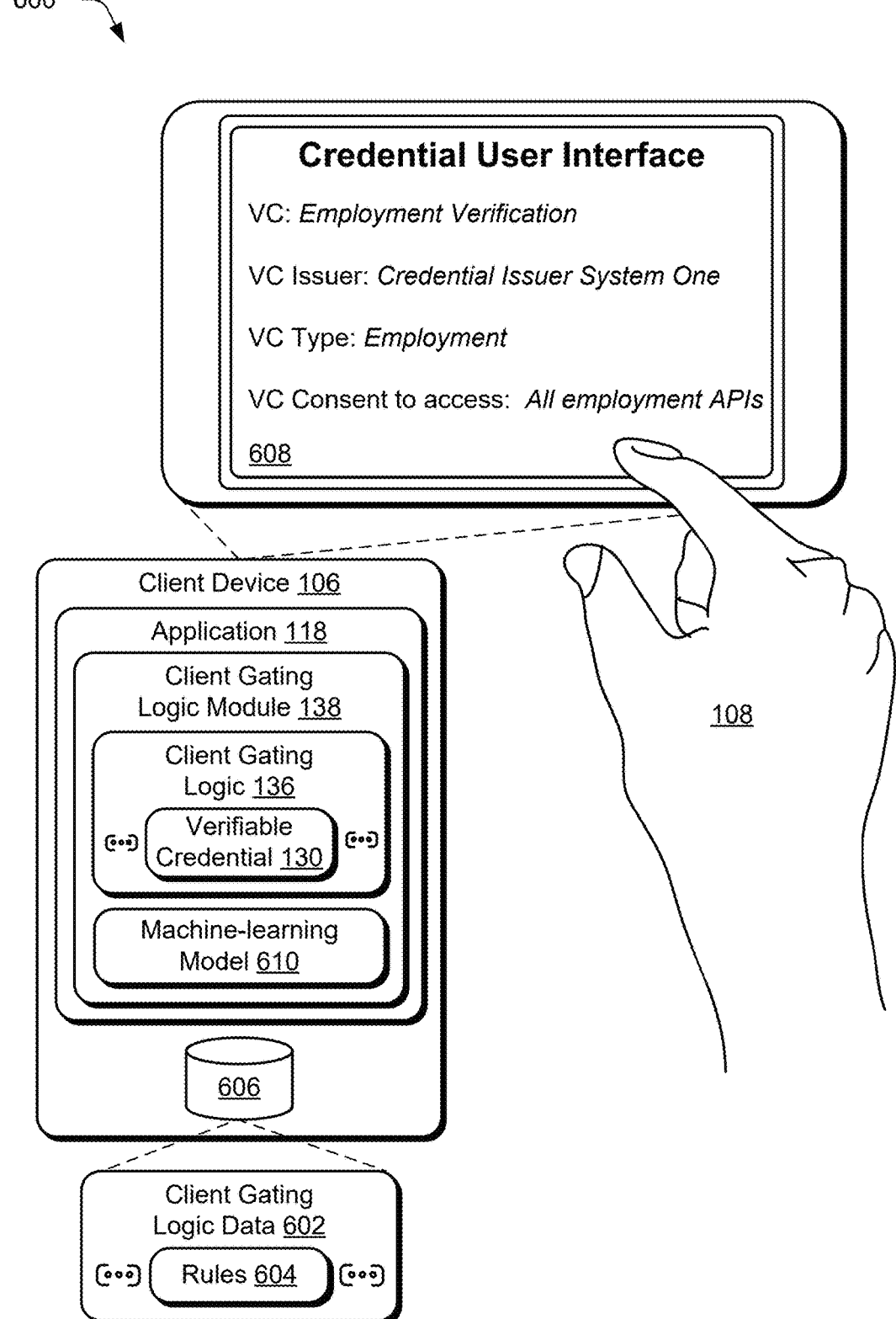
FIG. 6 is a non-limiting illustration of an example system that is operable to incorporate gating logic as part of a client device as an intelligent agent as described herein according to an implementation of the present subject matter.

FIG. 6 is a non-limiting illustration of an example system 600 that is operable to incorporate gating logic as part of a client device as an intelligent agent as described herein according to an implementation of the present subject matter. Gating logic is also employable at the client side in this example by an application 118 to control access to verifiable credentials 130 of an entity 108 associated with the client device 106, e.g., a user. The gating logic, for instance, is usable to control access to requested verifiable credentials, control which verifiable credential is to be provided in scenarios in which a plurality of verifiable credentials is usable (e.g., to minimize access to potentially sensitive information), and so forth.

To do so, the application 118 is executed to generate client gating logic data 602 having rules 604 configured to control exposure of the verifiable credentials 130, which is illustrated as stored in a storage device 606. The application 118, for instance, is obtained from the credential authority system 104 as compatible with verifiable credentials issued and verified by the system. The application 118 is executable similarity to the SDK 302 as described above to surface a user interface 608 to enter verifiable credentials 130 and define rules 604 controlling exposure of the verifiable credentials as part of client gating logic data 602.

The illustrated example of the user interface 608 includes options to enter criteria usable to define "how" and "when" verifiable credentials are exposed by the client device 106. The user interface 608, for instance, includes options configurable to specify a particular verifiable credential, an issuer of the verifiable credential, a type of the verifiable credential, and access permitted by the verifiable credential, e.g., to a particular API of the personal datastore interface 502 of the service gating logic module 134. The inputs are stored as client gating logic data 602 including rules 604 to control output of the verifiable credential 130.

In one or more implementations, generative artificial intelligence (AI) techniques are also supported through use of a machine-learning model 610, e.g., to generate the rules 604 as gating logic based on plain-language inputs received via the user interface. A plain language input, for instance, is received as text by the application 118 that specifies a desired outcome. The client gating logic module 138, in response using the machine-learning model 610, generates the client gating logic 136 as a decision tree to control output of the verifiable credential 130 based on "who" is requesting access, "how" the access is requested," "where" the verifiable credential 130 is to be communicated, and so forth. The client gating logic 136, for instance, is executable to implement an intelligent assistant that may operate "behind the scenes" to improve efficiency in access to digital services by automatically providing respective verifiable credentials. Execution of the gating logic as part of the application 118 at the client device 106 supports a wide variety of functionalities as further described in the following examples and shown in a corresponding figure.

Figure 7:
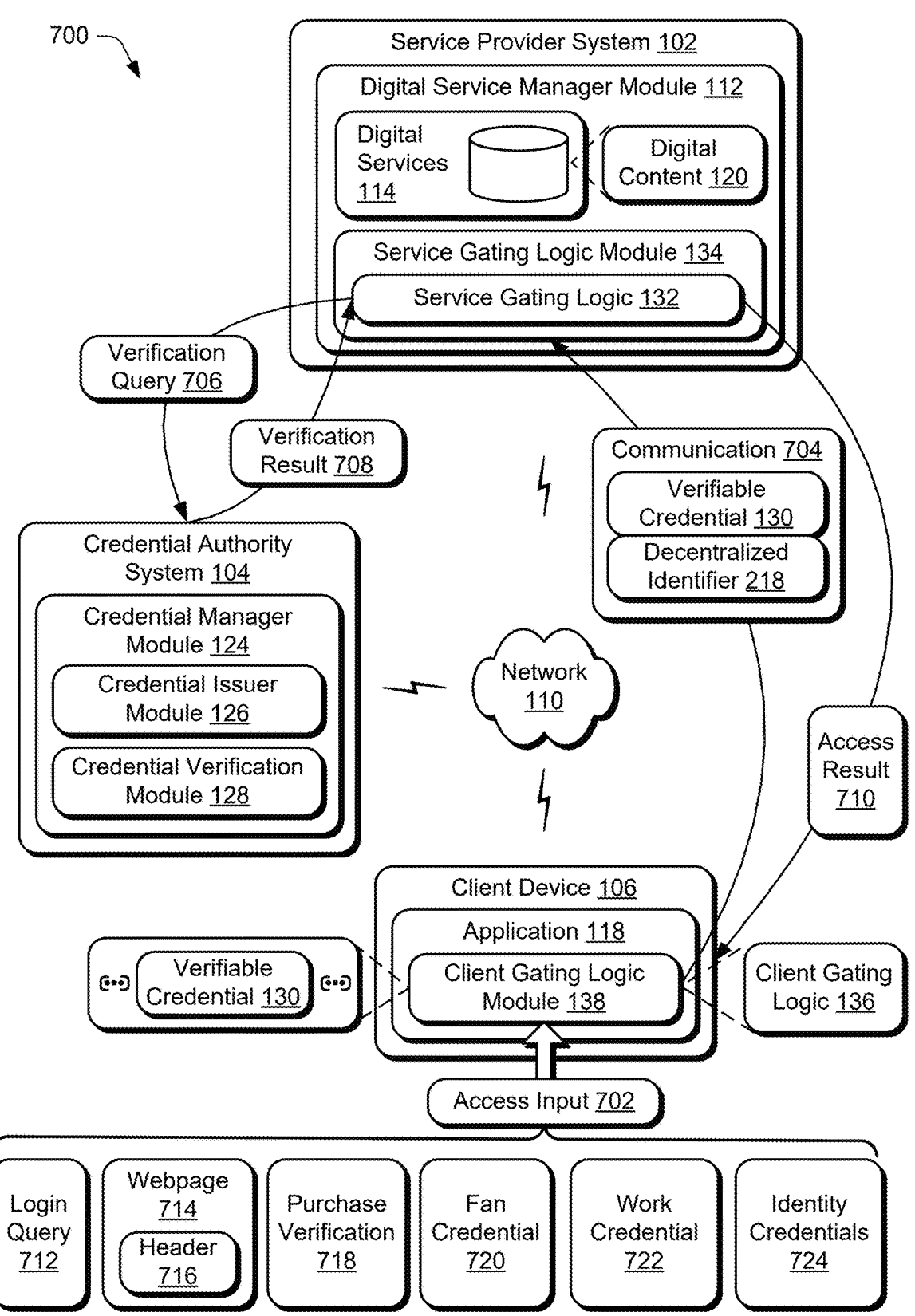
FIG. 7 is a non-limiting illustration of an example system that is operable to employ gating logic executed at a client device as an intelligent agent to control output of verifiable credentials as described herein according to an implementation of the present subject matter.

FIG. 7 is a non-limiting illustration of an example system 700 that is operable to employ gating logic executed at a client device as an intelligent agent to control output of verifiable credentials as described herein according to an implementation of the present subject matter. To begin in a first illustrated example, an access input 702 is received at a client gating logic module 138. The access input 702 requests access to a verifiable credential 130 maintained and managed by client gating logic 136 executed by the client gating logic module 138. The access input 702, for instance, is received from the service provider system 102 as a query responsive to a request to access digital content 120 that is made available via a digital service 114.

Execution of the client gating logic 136 is used to determine whether access to the verifiable credential 130 is permitted locally at the client device 106. The client gating logic 136, for instance, examines characteristics associated with the service provider system 102 that has made the request. If access is permitted, a communication 704 is formed and transmitted that includes the verifiable credential 130 and is signed by a decentralized identifier 218 of the entity 108 associated with the client device 106. The decentralized identifier 218, for instance, is used to sign the verifiable credential 130 by the client gating logic 136 to further verify the entity 108 "is who they say they are" as part of verification of the verifiable credential 130. Thus, execution of the client gating logic 136 on the client side in this part of the example is used to control output of the verifiable credential 130.

Execution of the service gating logic 132 at the service provider system 102 is then used in a second part of this example "on the server side" to control access to the digital content 120 maintained by the digital services 114. The service gating logic 132, for instance, is generated based on the SDK 302 received from the credential authority system 104 or other third-party system.

The service gating logic 132 is first tasked with determining whether the verifiable credential 130 is valid. To do so, a verification query 706 is generated by the service gating logic 132 and communicated to the credential verification module 128 of the credential manager module 124 via the network 110. The credential verification module 128 then checks the cryptographic signature on the verifiable credential 130 using a cryptographic key associated with the credential authority system 104, e.g., a public key associated with the credential authority system 104. A verification result 708 of which is returned to the service gating logic 132. The verification result 708 is used to verify to the service gating logic 132 that the verifiable credential 130 is issued by the credential authority system 104 and tampering has not occurred.

An access result 710 is then communicated by the service gating logic 132 to the logic module 138 to indicate a result of the verification of the verifiable credential 130 and/or whether access is permitted to the digital content 120 maintained by the digital services 114 based on the verification. Thus, use of the client gating logic 136 on the "client side" and use of the service gating logic 132 on the "server side" are examples of gating logic that are configurable to support a variety of operational scenarios.

In one or more initial examples, the gating logic functionality is usable in support of a login query 712. For example, a conventional technique is used to verify that an entity attempting to gain access to a resource is "not a machine," e.g., as a Captcha verification. Some implementations of Captcha rely upon a user text input to match an image of distorted text or user input to select images having a specific object. However, security of these conventional systems for human verification has diminished due to advances in object and text recognition techniques. Additionally, recent versions of "not a machine" verification (e.g., "reCAPTCHA") involve monitoring human interaction with computing devices and/or requesting a user input to click a control in a user interface to verify human presence. Similarly, these conventional techniques also present security risks due to advances in human behavioral mimicry by machines. Further, these conventional techniques interrupt access to resources for those users who have access privileges to such resources, causing frustration and increasing network traffic for numerous authentication exchanges, especially with image-based verification.

To address these challenges, the client gating logic module 138 is executed by the client device 106 to implement an intelligent agent. The intelligent agent is usable to automatically answer a "not a machine" using verifiable credentials "behind the scenes" without interrupting a user's navigation through various websites and with decreased network traffic than conventional authentication.

In a digital content navigation scenario, for instance, the client gating logic module 138 is implemented as a plugin module as part of a browser, e.g., the application 118. The client gating logic module 138 implements the intelligent assistant to control access to digital content 120 during navigation through the Internet, e.g., between webpages. A webpage 714, for instance, includes a header 716 that requests a verifiable credential, where the header 716 is "invisible" to the end user and is processed by the server and client applications, e.g., behind the scenes. The client gating logic 136 then determines, from the header 716, which verifiable credential 130 is requested and whether access to the verifiable credential 130 is permitted and may do so "behind the scenes" to improve efficiency in digital content navigation. A request to answer a "not a machine" query, for instance, is provided with a verifiable credential 130 of the credential authority system 104 indicating use by a human being.

In a purchase verification 718 example, the client device 106 receives the verifiable credential 130 indicating purchase of an album or another form of digital content. The verifiable credential 130, for instance, may be issued by a recording studio, by a digital content provider system, incorporated as part of the digital content 120 itself, and so forth. The verifiable credential 130 is then usable in conjunction with the client gating logic 136 by the client device 106 to access new and/or exclusive content, e.g., the digital content 120 maintained at the service provider system 102. The client gating logic 136 as executed by the client device 106, for instance, is provided automatically and without user intervention to access other digital content, fan messaging boards, is provided with an ability to review the digital content as having proof of purchase of the content, and so forth.

In a fan credential 720 example, the verifiable credential 130 is provided, automatically and without user intervention, by the client gating logic 136 to prove a threshold level of engagement. The level of engagement is definable in a variety of ways, such as a number of times an item of digital content is streamed, purchases of digital content, messages provided as part of a fan messaging board, concert and/or other event attendance, combinations of these or other forms of engagement, and so forth. The fan credential 720 indicating the threshold level of engagement may be used to unlock (e.g., without additional user intervention, as described herein) access to exclusive experiences, merchandise, early access to media content releases or event tickets, and the like.

The verifiable credential 130 is further usable in conjunction with client gating logic 136 to avoid repeated entry of login information to gain access to these digital services that are a subject of the engagement, e.g., a verifiable credential that is received responsive to a threshold level of engagement is then usable by the intelligent assistant implemented by the gating logic for subsequent access to those and other digital services. The verifiable credential 130, for instance, is usable to support subscription tier verification to permit or restrict access to digital content 120 and digital services 114 based on verifiable credential's attestation to a tier status.

The verifiable credential 130 is also configurable as a work credential 722 of an entity, e.g., to attest employment and in which capacity that employment pertains. A verifiable credential 130, for example, is configurable to specify an entity 108 is employed in a particular industry (e.g., through work association), in what capacity, and so forth. For instance, signup as implemented by a digital service 114 to an event held by a work association may limit attendance to entities "in the industry," e.g., doctors to a medical continued learning education conference. In this example, the verifiable credential 130 verifies an active medical license that, once verified, causes generation of another verifiable credential as a unique entry pass for that entity to the conference, e.g., a QR code that is scannable at the door, has the individual's name, medical specialty, and so forth.

The verifiable credential 130 is also configurable as an identity credential 724 to further verify an identity of a corresponding entity 108. In a financial application example, the verifiable credential 130 (e.g., as a driver's license) is used to access increased spending limits in conjunction with the service gating logic 132. The verifiable credential 130 is provided by the client gating logic module 138, as executed by the client device 106 automatically and without user intervention, in response to a request to support an additional level of trust in performing a transaction. In this example, the verifiable credential 130 confirms that the "user is who they say they are" and protects against compromise by malicious parties. In a business entity example, the verifiable credential 130 is usable by gating logic of a business entity for a business license, liquor license, cosmetology license, esthetician license, medical license, legal license, and other credentials involved in running a business. Client gating logic 136 is then used by a client device 106 of the business entity to control access based on requests for those credentials and "who" requested the credentials, e.g., by respective governmental and other business entities. Other financial examples are also contemplated, including provision of the verifiable credentials to access increased spending limits, access to digital services based on jurisdiction, age, and so on. Know your customer (KYC) checks are also supported to verify identity and research entity backgrounds in order to establish entity legitimacy, e.g., to provide identifying information via verifiable credentials.

The intelligent agent as implemented by the gating logic at the client device also supports an ability to verify that access to the verifiable credentials be granted, e.g., through a pop-up menu to authorize access via a user interface for particularly sensitive user credentials. In these examples, an entity associated with the verifiable credentials is provided with a choice of whether to provide respective verifiable credentials in response to particular queries, e.g., from a service provider system.

A service provider system, for instance, may request verifiable credentials to verify a geographic location associated with a respective entity and age of the respective entity. The gating logic may then generate a user interface in response that indicates a source of the query, what verifiable credentials are being requested, and an option to permit or restrict sharing of those credentials, e.g., to share age but not location.

Figure 8:
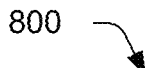
FIG. 8 is a non-limiting illustration of an example system that is operable to employ gating logic executed at a client device as an intelligent agent to confirm output of verifiable credentials as described herein according to an implementation of the present subject matter.

FIG. 8 is a non-limiting illustration of an example system 800 that is operable to employ gating logic executed at a client device as an intelligent agent to confirm output of verifiable credentials as described herein according to an implementation of the present subject matter. In the previous examples, the client gating logic 136 is configurable to operate "behind the scenes" to control output of the verifiable credential 130. The client gating logic 136 is also configurable to verify that output of the verifiable credential 130 is permitted.

The client gating logic 136, for instance, is executable to generate a user interface 802 including options to permit 804 (e.g., "yes") or restrict 806 (e.g., "no") output of the verifiable credential 130. Continuing with the examples above, the logic module 138 executes the client gating logic 136 to determine that the access to the verifiable credential 130 is permitted. The logic module 138 then outputs a user interface 802 to confirm that this access is also permitted by the entity 108. In this way, the entity 108 is provided with a degree of control of potentially sensitive information, e.g., social security numbers and so forth.

In an implementation, the client gating logic 136 also employs a machine-learning model 808 that is trained and retrained over time based on monitored user interaction to control instances in which the user interface 802 is output. The machine-learning model 808, for instance, learns patterns in user interaction to determine when to confirm output of the verifiable credential 130, e.g., the entity 108 has an inconsistent pattern in approving output, to identify what is considered "sensitive" by the entity 108, and so forth.

Figure 9:
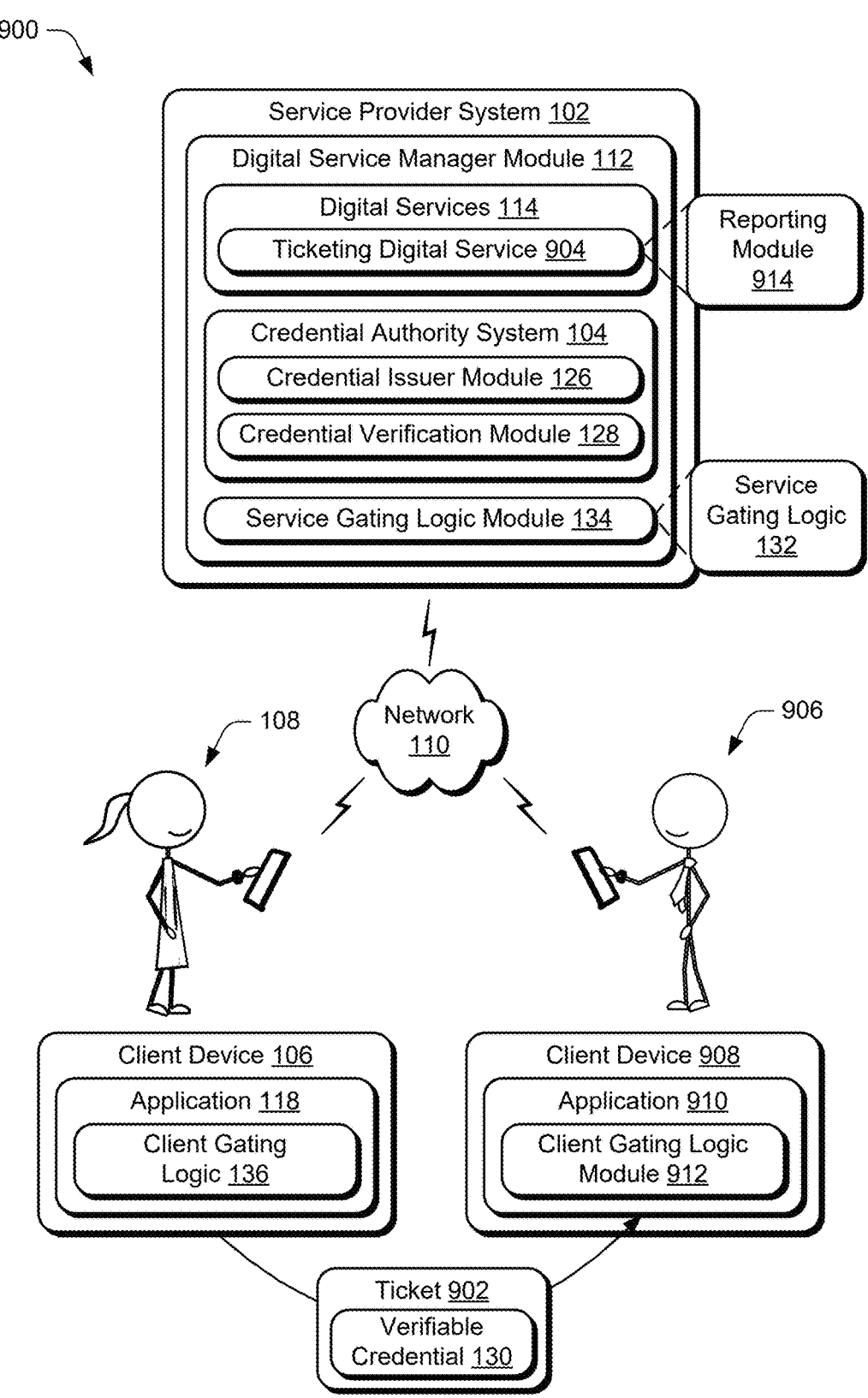
FIG. 9 is a non-limiting illustration of an example system that is operable to employ gating logic in a ticketing scenario as described herein according to an implementation of the present subject matter.

FIG. 9 is a non-limiting illustration of an example system 900 that is operable to employ gating logic in a ticketing scenario as described herein according to an implementation of the present subject matter. The verifiable credential 130, for instance, may be communicated as a ticket 902 through near field communication (NFC) as a mechanism for validating that the entity 108 has a ticket to an event, e.g., is permitted to pass through security, and so on. The service provider system 102 includes a ticketing digital service 904 that is executed as one of the digital services 114 to control access to the event. To do so, the ticketing digital service 904 leverages a service gating logic module 134 that employs service gating logic 132 to process the verifiable credential 130 of the ticket 902.

Output of the verifiable credential 130 is controllable through the client gating logic 136 as previously described that is executed at the client device 106, e.g., as implementing the intelligent assistant. Use of the client gating logic 136 enables the respective entity 108 access to a respective event without physical or digital tickets, for instance, by broadcasting the verifiable credential 130 by the client device 106 responsive to crossing a near field communication reader.

In one or more examples, the verifiable credential verifiable credential 130 is utilized in a "bearer proof" scenario. Accordingly, the verifiable credential 130 is also usable to transfer ownership of a ticket, e.g., from the entity 108 associated with the client device 106 to a second entity 906 associated with a second client device 908. The second client device 908, for instance, also includes an application 910 having a client gating logic module 912 executing respective client gating logic.

The ticket 902 through use of the corresponding verifiable credential 130 is usable to facilitate a transfer between the entities through a "handshake" implemented by the service provider system 102 as implementing the ticketing digital service 904. The transfer is based on "who has" the verifiable credential 130 associated with the ticket 902.

In this example, the credential authority system 104 is incorporated as part of the service provider system 102. The credential authority system 104 includes a credential issuer module 126 that is configured to issue the verifiable credential 130 as the ticket 902. To do so, the credential issuer module 126 issues the verifiable credential 130 and signs the verifiable credential 130 with a cryptographic key, e.g., a private key. The signature of the verifiable credential 130 is therefore verifiable using the credential verification module 128, e.g., using a public key exposed by the credential verification module 128. The ticket 902 is transferable from the application 118 of the client device 106 to the application 910 of the second client device 908, e.g., via associated digital wallets. The second entity 906, and more particularly the second client device 908 of the second entity 906, is therefore the bearer of the ticket 902 and considered as the rightful owner, which is then usable to gain access to the event managed by the ticketing digital service 904.

A reporting module 914 is also included in the illustrated example that is representative of reporting functionality. Reporting functionality, for instance, is configurable to track metrics associated with an event managed by the ticketing digital service 904. Examples of reporting functionalities include a gate success rate and who has access to the gate, what credentials and types of credentials have been used and their specific success rates, and so on. For example, the reporting module 914 may surface a notification if an issue fails eighty percent of the time. A variety of other usage scenarios are also contemplated.

Example Procedures

FIG. 10 is a flow diagram depicting a step-by-step procedure 1000 in an example implementation of operations performable by a processing device for accomplishing a result in which access is granted to a digital service through verification of verified credentials as controlled by gating logic implemented using a software development kit. The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9.

To begin in this example, a software development kit (SDK 302) is exposed by a service provider system 102. The SDK 302 has functionality to generate gating logic that is executable to control access to a digital service (block 1002), e.g., as service gating logic 132.

Inputs are received via a user interface 402 exposed by the software development kit defining a respective digital service 114 and criteria that are to be used to control access to the respective digital service 114 (block 1004). The criteria, for instance, may indicate that access to a signup webpage for a conference managed by the digital services 114 is limited to a certain professional group, e.g., doctors. Accordingly, access is managed using the service gating logic 132 to entities that have a verifiable credential associated with the professional group. The SDK 302 then generates the gating logic based on the inputs using a machine-learning model as implemented using generative artificial intelligence (block 1006).

The SDK 302, for instance, includes a generative AI 404 implemented by a respective machine-learning model 406, which is usable to convert the inputs (e.g., as natural language) into rules assigned to respective APIs to control access as illustrated in FIG. 5.

The gating logic is then executed in conjunction with the digital service 114 (block 1008), e.g., a service gating logic 132. A query is then received at the service gating logic 132 to access the digital service 114 from a client device 106 of a user (block 1010), e.g., entity 108. The service gating logic 132 causes communication of a request to the client device 106 for a verifiable credential 130 of the user based on the service gating logic 132. A response is received to the request (e.g., communication 704) that includes the verifiable credential 130 as signed by a decentralized identifier 218 associated with the user (block 1012), e.g., the entity 108.

The service gating logic module 134 is then used to verify whether the verifiable credential 130 complies with the service gating logic 132 through interaction with an issuer of the verifiable credential 130 (block 1014), e.g., the credential authority system 104. The service gating logic module 134, for instance, generates a verification query 706 and receives a verification result 708 indicating whether a signature of the verifiable credential 130 is valid.

Responsive to determination that the verifiable credential 130 is not verified ("no" from decision block 1016), access is restricted (block 1018). The verification result 708, for instance, may indicate that the verifiable credential 130 has been tampered with and therefore the verification fails. In response, the service gating logic 132 restricts access by the client device 106 to the digital services 114 and communicates an access result 710 to the client device 106.

Responsive to determination that the verifiable credential is verified ("yes" from decision block 1016), access by the client device 106 is permitted to the digital service 114 (block 1018), e.g., to stream the digital content 120, perform a person-to-person transaction, and so forth. A variety of other examples of use of digital services 114 as leveraging gating logic are also contemplated.

FIG. 11 is a flow diagram depicting a step-by-step procedure 1100 in an example implementation of operations performable by a processing device for accomplishing a result in which access to a webpage is received responsive to successful verification of a verifiable credential as indicated by a header of the webpage by executing gating logic implementing an intelligent assistant. The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9.

In this example, a request is detected in a header 716 of a webpage 714 for a verifiable credential through execution of client gating logic 136 by a client gating logic module 138 at the client device 106 (block 1102), e.g., by a processing device of the client device 106.

A verifiable identifier of a plurality of verifiable credentials is identified that is referenced in the request (block 1104). The identification of the verifiable credential is performed through execution of the client gating logic 136. The header 716, for instance, identifies a type of credential and the client gating logic 136 determines whether that type is included as one of the plurality of verifiable credentials maintained by the client gating logic 136.

A determination is then made, through local execution of the client gating logic 136, whether access to the verifiable credential is permitted (block 1106). Metadata of the verifiable credential, once identified, is then examined to determine which access rules control access to the credential and whether those access rules are complied with by the request in the header 716 of the webpage 714, by an originator of the webpage 714, and so forth.

Responsive to a determination that access is not permitted ("no" from decision block 1108), access is restricted (block 1110). The client gating logic 136, for instance, identifies that the verifiable credential 130 includes sensitive information and/or that the request is likely originated by a malicious party. In response, the client gating logic 136 rejects the request in the header 716.

Responsive to a determination that access is permitted ("yes" from decision block 1108), the verifiable credential is communicated (block 1112) and access to the webpage is received responsive to successful verification of the verifiable credential (block 1114). The access, for instance, may include communication of additional portions of the webpage 714, unlocking portions of the webpage 714 already received by the client device 106, and so forth. Use of the client gating logic 136 as implementing an intelligent assistant to control output of the verifiable credential 130 is also contemplated in a variety of other usage scenarios are previously described above, e.g., with respect to FIG. 7.

Example Environments

Figure 12:
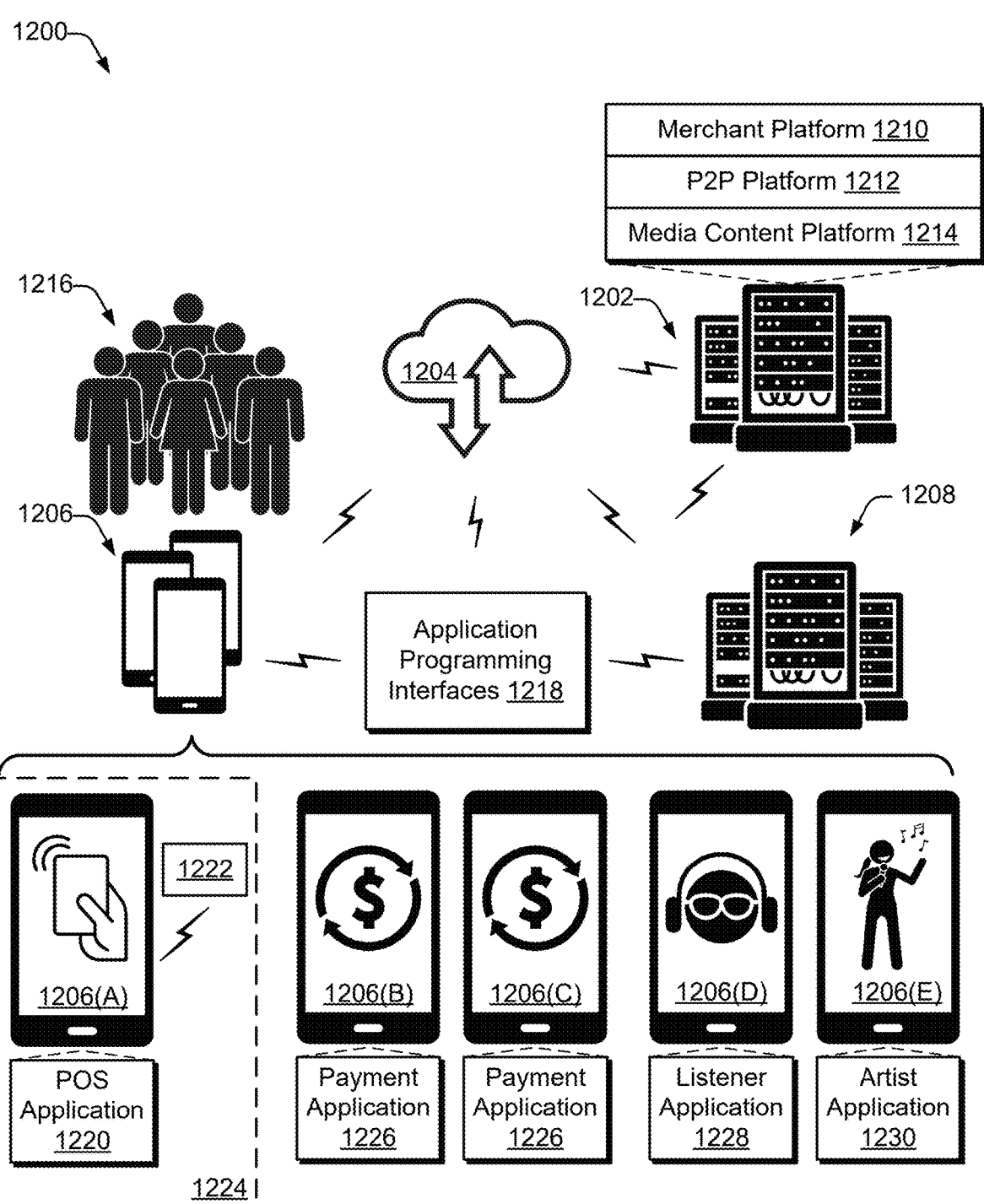
FIG. 12 is a non-limiting example illustrating an environment in which recommendation techniques described herein are performed in accordance with one or more implementations.

FIG. 12 illustrates an example environment 1200 in which recommendation techniques described herein are performed in accordance with one or more implementations. The environment 1200 includes server(s) 1202 that can communicate over a network 1204 with end user devices 1206 and/or server(s) 1208 associated with third-party service provider(s). In various examples, the end user devices 1206 may comprise one or more seller devices 1206(A), one or more user devices 1206(B) and/or 1206(C) in a peer network, one or more content consumption devices 1206(D), one or more artist devices 1206(E), combinations of these examples, or other categories of user devices. The server(s) 1202 can be associated with one or more service providers that can provide one or more services for the benefit of users 1216, as described below. For example, the server(s) 1202 may enable services of service providers such as in association with a seller platform 1210 (which may further include a buyer platform), a peer-to-peer (P2P) payment platform 1212, a media content platform 1214, a combination of these platforms, or other platforms associated with other service providers. While services and features are referenced throughout in connection with a particular one of the seller platform 1210, the P2P payment platform 1212, or the media content platform 1214, it should be understood that any of these platforms may perform the functionality described in relation to any of the other platforms. Actions attributed to the service provider(s) can be performed by the server(s) 1202, e.g., for the service provider system 102 and/or the credential authority system 104.

In some examples, individual ones of the end user devices 1206 can be operable by users 1216. The users 1216 (individually referred to herein as "user 1216") can be referred to as customers, buyers, merchants, sellers, borrowers, employees, employers, payors, payees, couriers, artists, musicians, listeners, fans, supervisors, hosts, audience members, and so on. The users 1216 can interact with the end user devices 1206 via user interfaces presented via the end user devices 1206. In at least one example, a user interface can be presented via a web browser, or the like. Alternatively or additionally, a user interface can be presented via an application, such as a mobile application or desktop application, which can be provided by the seller platform 1210, the P2P payment platform 1212, and/or the media content platform 1214, or which can be an otherwise dedicated application. In some examples, individual end user devices 1206 can have an instance or versioned instance of an application, which can be downloaded from an application store, for example, which can present the user interface(s) described herein.

In at least one example, the users 1216 can include merchants that can operate the seller device(s) 1206(A) that are configured for use by merchants. For the purpose of this discussion, a "merchant" can be any entity that offers items (e.g., goods or services) for purchase or other means of acquisition (e.g., rent, borrow, barter, etc.). The merchants can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants can be associated with the same entity but can have different merchant locations and/or can have franchise/franchisee relationships.

In additional or alternative examples, the merchants can be different merchants. For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

The seller device 1206(A) can have an instance of a point of sale ("POS") application 1220 stored thereon. The POS application 1220 can configure the seller device 1206(A) as a POS terminal, which enables the merchant to interact with one or more customers. In at least one example, interactions between the customers and the merchants that involve the exchange of funds (from the customers) for items or services (from the merchants) can be referred to as "transactions." In at least one example, the POS application 1220 can determine transaction data associated with the POS transactions. Transaction data can include payment information, which can be obtained from a reader device 1222 associated with the seller device 1206(A), user authentication data, purchase amount information, point-of-purchase information (e.g., item(s) purchased, date of purchase, time of purchase, subscription type, etc.), etc. The POS application 1220 can send transaction data to the server(s) 1202 such that the server(s) 1202 can track transactions of the customers, merchants, and/or the users 1216 over time. Furthermore, the POS application 1220 can present a UI to enable the merchant to interact with the POS application 1220 and/or the seller platform 1210 via the POS application 1220.

In at least one example, the seller device 1206(A) can be a special-purpose computing device configured as a POS terminal (via the execution of the POS application 1220). In at least one example, the POS terminal may be connected to a reader device 1222, which is capable of accepting a variety of payment instruments, such as credit cards, debit cards, gift cards, short-range communication based payment instruments, and the like, as described below. In at least one example, the reader device 1222 can plug in to a port in the seller device 1206(A), such as a microphone port, a headphone port, an audio-jack, a data port, or other suitable port. In additional or alternative examples, the reader device 1222 can be coupled to the seller device 1206(A) via another wired or wireless connection, such as via Bluetooth®, BLE, and so on. In some examples, the reader device 1222 can be a software solution executing on the POS terminal, e.g., a mobile phone. In some examples, the reader device 1222 can read information from alternative payment instruments including, but not limited to, wristbands and the like.

In some examples, the reader device 1222 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards, hardware wallets, fobs, or devices configured for tapping). The POS terminal may provide a rich user interface, communicate with the reader device 1222, and communicate with the seller platform 1210, which can provide, among other services, a payment processing service. The server(s) 1202 associated with the seller platform 1210 can communicate with server(s) 1208, as described below. In this manner, the POS terminal and reader device 1222 may collectively process transaction(s) between the merchants and customers. In some examples, multiple POS terminal(s) may be connected to a number of other devices, such as "secondary" terminals, e.g., back-of-the-house systems, printers, line-buster devices, reader devices, speakers, and the like, to allow for information from the secondary terminal to be shared between the primary POS terminal(s) and secondary terminal(s), for example via short-range communication technology. This kind of arrangement may continue operation in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1222 of the POS system 1224 are shown as separate devices, in additional or alternative examples, the POS terminal and the reader device 1222 can be part of a single device. In some examples, the reader device 1222 can have a display integrated therein for presenting information to customers of a merchant. In additional or alternative examples, the POS terminal can have a display integrated therein for presenting information to the customers of the merchant. POS systems, such as the POS system 1224, may be mobile, such that POS terminals and reader devices may process transactions in disparate locations across the world. POS systems can be used for processing card-present transactions and card-not-present (CNP) transactions.

A card-present transaction is a transaction where both a customer and the customer's payment instrument are physically present at the time of the transaction. Card-present transactions may be contact or contactless transactions processed by swipes (e.g., by sliding a magnetic strip through a reader device), dips (e.g., by inserting an embedded microchip into a reader device), taps (e.g., by wirelessly, through Bluetooth, NFC or other short range technology hover or tap a payment instrument into a reader device), or any other interaction between a physical payment instrument (e.g., a card), or otherwise present payment instrument, and a reader device 1222, whereby the reader device 1222 is able to obtain payment data from the payment instrument.

A CNP transaction is a transaction where a card, or other payment instrument, is not physically present at the POS such that payment data is manually keyed in (e.g., by a merchant, customer, etc.), or payment data is required to be recalled from a card-on-file data store, to complete the transaction.

The POS system 1224, the server(s) 1202, and/or the server(s) 1208 may exchange payment information and transaction data to determine whether transactions are authorized. For example, the POS system 1224 may provide encrypted payment data, user authentication data, purchase amount information, point-of-purchase information, etc. (collectively, transaction data) to server(s) 1202 over the network(s) 1204. The server(s) 1202 may send the transaction data to the server(s) 1208.

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. In at least one example, the service provider can serve as an acquirer and connect directly with the card payment network.

The card payment network (e.g., the server(s) 1208 associated therewith) can forward the fund transfer request to an issuing bank (e.g., "issuer"). The issuer is a bank or financial institution that offers a financial account (e.g., credit or debit card account) to a user. The issuer (e.g., the server(s) 1208 associated therewith) can make a determination as to whether the customer has the capacity to absorb the relevant charge associated with the payment transaction. In at least one example, the seller platform 1210 can serve as an issuer and/or can partner with an issuer. The transaction is either approved or rejected by the issuer and/or the card payment network (e.g., the server(s) 1208 associated therewith), and a payment authorization message is communicated from the issuer to the POS device via a path opposite of that described above, or via an alternate path.

The server(s) 1208 may send an authorization notification over the network(s) 1204 to the server(s) 1202, which may send the authorization notification to the POS system 1224 over the network(s) 1204 to indicate whether the transaction is authorized. The server(s) 1202 may also transmit additional information such as transaction identifiers to the POS system 1224. In one example, the server(s) 1202 may include a merchant application and/or other functional components for communicating with the POS system 1224 and/or the server(s) 1208 to authorize or decline transactions (e.g., the API 1218). In examples, the seller platform 1210 can enable the merchants to receive cash payments, payment card payments, and/or electronic payments from customers for POS transactions and the service provider can process transactions on behalf of the merchants.

Based on the authentication notification that is received by the POS system 1224 from server(s) 1202, the merchant may indicate to the customer whether the transaction has been approved. In some examples, approval may be indicated at the POS system 1224, for example, at a display of the POS system 1224. In some cases, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The seller platform 1210 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the user devices 1206 can access all of the services. In some cases, the user devices 1206 can have gradated access to the services, which can be based on risk tolerance, IDV outputs, subscriptions, and so on. In at least one example, access to such services can be availed to the merchants via the POS application 1220. In additional or alternative examples, each service can be associated with its own access point (e.g., application, web browser, etc.).

As the seller platform 1210 processes transactions on behalf of the merchants, the seller platform 1210 can maintain accounts or balances for the merchants in one or more ledgers. For example, the seller platform 1210 can analyze transaction data received for a transaction to determine an amount of funds owed to a merchant for the transaction and deposit funds into an account of the merchant. The account can have a stored balance, which can be managed by the seller platform 1210. The account can be different from a conventional bank account at least because the stored balance is managed by a ledger of the seller platform 1210 and the associated funds are accessible via various withdrawal channels including, but not limited to, scheduled deposit, same-day deposit, instant deposit, and a linked payment instrument.

A scheduled deposit can occur when the seller platform 1210 transfers funds associated with a stored balance of the merchant to a bank account of the merchant that is held at a bank or other financial institution (e.g., associated with the server(s) 1208). Scheduled deposits can occur at a prearranged time after a POS transaction is funded, which can be a business day after the POS transaction occurred, or sooner or later. In some examples, the merchant can access funds prior to a scheduled deposit (e.g., same-day deposits and/or real-time deposits). Further, in at least one example, the merchant can have a payment instrument that is linked to the stored balance that enables the merchant to access the funds without first transferring the funds from the account managed by the seller platform 1210 to the bank account of the merchant.

In at least one example, the seller platform 1210 may provide inventory management services. That is, the seller platform 1210 may provide inventory tracking and reporting. Inventory management services may enable the merchant to access and manage a database storing data associated with a quantity of each item that the merchant has available (i.e., an inventory). Furthermore, in at least one example, the seller platform 1210 can provide catalog management services to enable the merchant to maintain a catalog, which can be a database storing data associated with items that the merchant has available for acquisition (i.e., catalog management services). The seller platform 1210 can offer recommendations related to pricing of the items, placement of items on the catalog, and multi-party fulfillment of the inventory, to name a few examples.

In at least one example, the seller platform 1210 can provide business banking services, which allow the merchant to track deposits (from payment processing and/or other sources of funds) into an account of the merchant, payroll payments from the account (e.g., payments to employees of the merchant), payments to other merchants (e.g., business-to-business) directly from the account or from a linked debit card, withdrawals made via scheduled deposit and/or real-time deposit, configure allocations among multiple balances or accounts (e.g., spending, saving, taxes, etc.), etc. Furthermore, the business banking services can enable the merchant to obtain a customized payment instrument (e.g., credit card), check how much money the merchant is earning (e.g., via presentation of available earned balance), understand where the money of the merchant is going (e.g., via deposit reports (which can include a breakdown of fees), spend reports, etc.), access/use earned money (e.g., via scheduled deposit, real-time deposit, linked payment instrument, etc.), have improved control of the money of the merchant (e.g., via management of deposit schedule, deposit speed, linked instruments, etc.), etc. Moreover, the business banking services can enable the merchants to visualize their cash flow to track their financial health, set aside money for upcoming obligations (e.g., savings), organize money around goals, etc.

In at least one example, the seller platform 1210 can provide financing services and products, such as via business loans, consumer loans, fixed term loans, flexible term loans, and the like. In at least one example, the service provider can utilize one or more risk signals to determine whether to extend financing offers and/or terms associated with such financing offers. Such risk signals can be particular to an individual platform or service, as described herein, or can be based on aggregated data associated with multiple of the platforms or services. In at least one example, the seller platform 1210 can provide financing services for offering and/or lending a loan to a borrower that is to be used for, in some instances, financing the borrower's short-term operational needs (e.g., a capital loan).

Additionally or alternatively, the seller platform 1210 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant. The seller platform 1210 can generate the loan based at least in part on determining that the borrower purchased or intends to purchase the item from the merchant. Advances, loans, or other funds provided to a merchant or other user can be repaid via a variety of mechanisms. In some examples, loans can be repaid in installments (e.g., multiple payments over time), at a particular date, from a portion of incoming funds (e.g., payments processed for the merchant, tax refunds, direct deposits, etc.), or the like.

The seller platform 1210 can provide web-development services, which enable users 1216 who are unfamiliar with HTML, XML, Javascript, CSS, or other web design tools to create and maintain functional websites. Further, in addition to websites, the web-development services can create and maintain other online omni-channel presences, such as social media posts for example. In some examples, the resulting web page(s) and/or other content items can be used for offering item(s) for sale via an online/e-commerce platform. In at least one example, the seller platform 1210 can recommend and/or generate content items to supplement omni-channel presences of the merchants.

Furthermore, the seller platform 1210 can provide payroll services to enable employers to pay employees for work performed on behalf of employers. In at least one example, the seller platform 1210 can receive data that includes time worked by an employee (e.g., through imported timecards and/or POS interactions), sales made by the employee, gratuities received by the employee, and so forth. Based on such data, the seller platform 1210 can make payroll payments to employee(s) on behalf of an employer via the payroll service. For instance, the seller platform 1210 can facilitate the transfer of a total amount to be paid out for the payroll of an employee from the bank of the employer to the bank of the seller platform 1210 to be used to make payroll payments. In at least one example, when the funds have been received at the bank of the seller platform 1210, the seller platform 1210 can pay the employee, such as by check or direct deposit.

Moreover, in at least one example, the seller platform 1210 can provide employee management services for managing schedules of employees. Further, the seller platform 1210 can provide appointment services for enabling users 1216 to set schedules for scheduling appointments and/or users 1216 to schedule appointments.

In some examples, the seller platform 1210 can provide restaurant management services to enable users 1216 to make and/or manage reservations, to monitor front-of-house and/or back-of-house operations, and so on. In such examples, the seller device(s) 1206(A) and/or server(s) 1202 can be configured to communicate with one or more other computing devices, which can be located in the front-of-house (e.g., POS device(s)) and/or back-of-house (e.g., kitchen display system(s) (KDS)). In at least one example, the seller platform 1210 can provide order management services and/or fulfillment services to enable restaurants (or other merchant types) to manage open tickets, split tickets, and so on and/or manage fulfillment services.

In some examples, the seller platform 1210 can provide omni-channel fulfillment services. A fulfillment service includes item ordering and delivery services, such as via a courier. In some examples, the courier can be an unmanned aerial vehicle (e.g., a drone), an autonomous vehicle, or any other type of vehicle capable of receiving instructions for traveling between locations. For instance, if a customer places an order with a merchant and the merchant cannot fulfill the order because one or more items are out of stock or otherwise unavailable, the seller platform 1210 can leverage other merchants and/or sales channels that are part of the seller platform 1210 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the seller platform 1210 can enable conversational commerce via conversational commerce services, which can use one or more machine learning mechanisms to analyze messages exchanged between two or more users 1216, voice inputs into a virtual assistant or the like, to determine intents of user(s) 1216. In some examples, the seller platform 1210 can utilize determined intents to automate customer service, offer promotions, provide recommendations, or otherwise interact with customers in real-time. In at least one example, the seller platform 1210 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1216 may be new to the seller platform 1210 such that the user 1216 that has not registered (e.g., subscribed to receive access to one or more services offered by the seller platform 1210) with the seller platform 1210. The seller platform 1210 can offer onboarding services for registering a potential user 1216 with the seller platform 1210. In some examples, onboarding can involve presenting various questions, prompts, and the like to a potential user 1216 to obtain information that can be used to generate a profile for the potential user 1216. In at least one example, the seller platform 1210 can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In response to full or partial completion of onboarding, any limited or short-term access to services of the seller platform 1210 can be transitioned to more permissive (e.g., less limited) or longer-term access to such services.

The seller platform 1210 can be associated with IDV services, which can be used by the seller platform 1210 for compliance purposes and/or can be offered as a service, for instance to third-party service providers (e.g., associated with the server(s) 1208). That is, the seller platform 1210 can offer IDV services to verify the identity of users 1216 seeking to use or using their services. Identity verification may involve requesting a customer (or potential customer) to provide information that is used by compliance departments to prove that the information is associated with an identity of a real person or entity (e.g., an artist). In at least one example, the seller platform 1210 can perform services for determining whether identifying information provided by a user 1216 accurately identifies the customer (or potential customer).

Techniques described herein can be configured to operate in both real-time/online and offline modes. "Online" modes refer to modes when devices are capable of communicating with the seller platform 1210 while offline mode refers to modes when devices are unable to communicate with the server(s) 1208 due to network connectivity issue, for example. In such examples, devices may operate in "offline" mode where at least some payment data is stored (e.g., on the seller device(s) 1206(A)) and/or the server(s) 1202 until connectivity is restored and the payment data can be transmitted to the server(s) 1202 and/or the server(s) 1208 for processing.

In at least one example, the seller platform 1210 can be associated with a hub, such as an order hub, an inventory hub, a fulfillment hub and so on, which can enable integration with one or more additional service providers (e.g., associated with the additional server(s) 1208). In some examples, such additional service providers can offer additional or alternative services and the service provider can provide an interface or other computer-readable instructions to integrate functionality of the service provider into the one or more additional service providers.

Turning now to the P2P functionality provided by the environment 1200, the P2P platform 1212 can provide a peer-to-peer payment service that enables peer-to-peer payments between two or more of the users 1216. Two or more of the users 1216 may be considered "peers" in a peer-to-peer interaction, such as a payment. In at least one example, the P2P platform 1212 can communicate with instances of a payment application 1226 (or other access point) installed on end user devices 1206 configured for operation by the users 1216. In an example, an instance of the payment application 1226 executing on a first user device 1206(B) operated by a payor (e.g., one of the users 1216) can send a request to the P2P platform 1212 to transfer an asset (e.g., fiat currency, non-fiat currency, digital assets such as non-fungible tokens (NFTs), cryptocurrency, securities, gift cards, and/or related assets) from the payor to a payee (e.g., a different one of the users 1216) via a peer-to-peer payment. In some examples, assets associated with an account of the payor are transferred to an account of the payee. In some examples, assets can be held at least temporarily in an account of the P2P platform 1212 prior to transferring the assets to the account of the payee.

Figure 13:
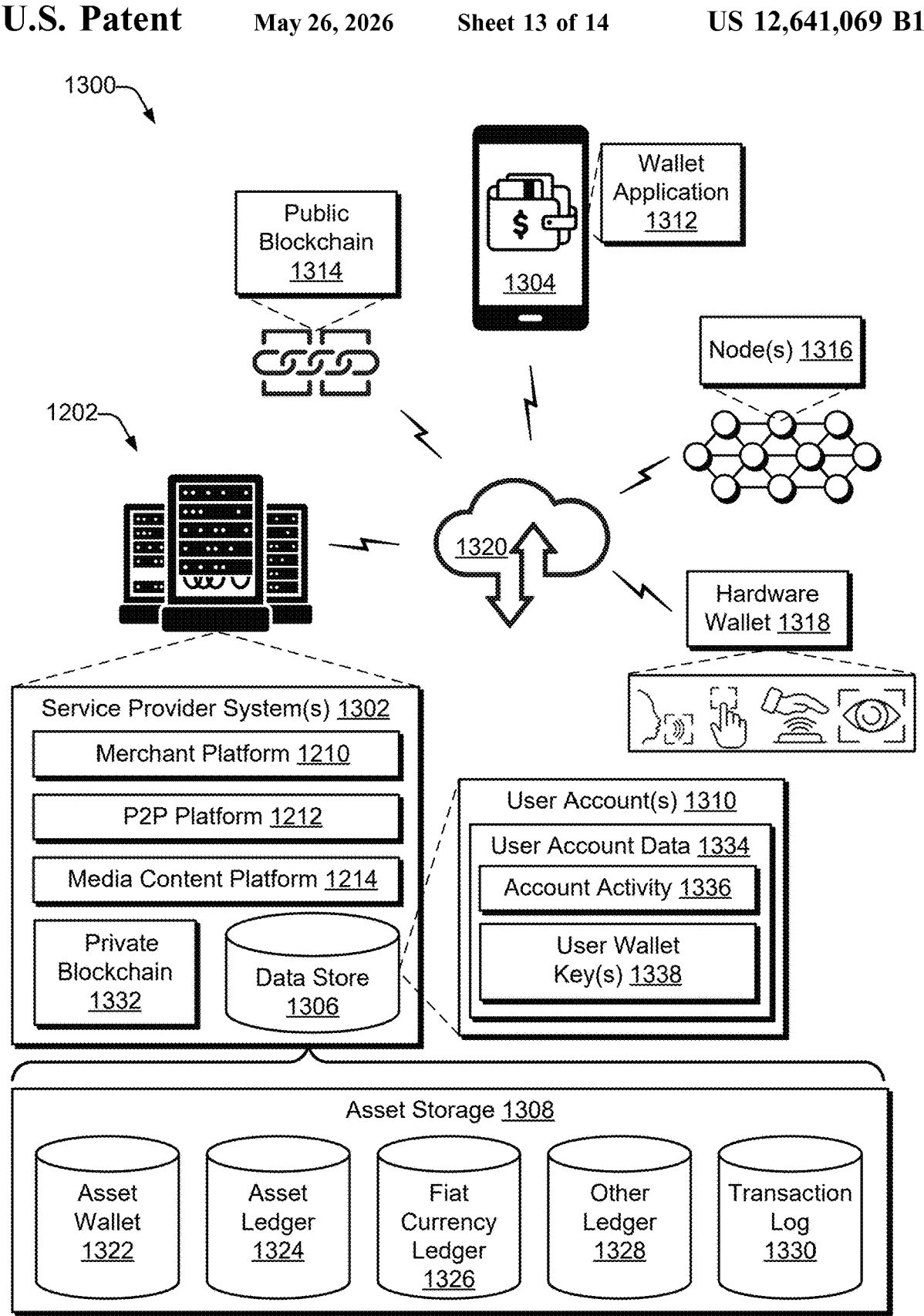
FIG. 13 is a non-limiting example illustrating an environment in which recommendation techniques described herein are performed in accordance with one or more implementations.

In some examples, the P2P platform 1212 can utilize a ledger system to track transfers of assets between users 1216. FIG. 13, below, provides additional details associated with such a ledger system. The ledger system can enable users 1216 to own fractional shares of assets that are not conventionally available. For instance, a user can own a fraction of a Bitcoin, an NFT, or a stock. Additional details are described herein.

In at least one example, the P2P platform 1212 can facilitate transfers and can send notifications related thereto to instances of the payment application 1226 executing on user device(s) of payee(s). As an example, the P2P platform 1212 can transfer assets from an account of a first user to an account of a second user and can send a notification to the user device 1206(B) of the second user for presentation via a user interface. The notification can indicate that a transfer is in process, a transfer is complete, or the like. In some examples, the P2P platform 1212 can send additional or alternative information to the instances of the payment application 1226 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the P2P platform 1212 funds the request to payee on behalf of the payor, to speed up the transfer process and compensate for lags that may be attributed to the payor's financial network.

In some examples, the P2P platform 1212 can trigger the peer-to-peer payment process through identification of a "payment proxy" having a particular syntax. The payment proxy is useable in lieu of payment data. That is, payment data and a payment proxy can be linked to, or otherwise associated with, a user account of a user and either can be used for making payments. In an example, the syntax can include a monetary currency indicator prefixing one or more alphanumeric characters (e.g., $Cash). The currency indicator operates as the tagging mechanism that indicates to the server(s) 1202 to treat the inputs as a request from the payor to transfer assets, where detection of the syntax triggers a transfer of assets. The currency indicator can correspond to various currencies including but not limited to, dollar ($), euro (€), pound (£), rupee (R), yuan (¥), etc. Although use of the dollar currency indicator ($) is used herein, it is to be understood that any currency symbol or other symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 1226 executing on the end user devices 1206. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can be a uniform resource locator (URL), which can include a payment proxy discussed above. The P2P platform 1212 can generate the landing page to enable the recipient to conveniently receive one or more payments from one or more senders.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 12 or a third-party service provider associated with the server(s) 1208. In examples where the content provider is a third-party service provider, the server(s) 1208 can be accessible via one or more APIs 1218 or other integrations. In some examples, "forum" may also refer to an application or webpage of an e-commerce or retail organization that offers products and/or services. Such websites can provide an online "form" to complete before or after the products or services are added to a virtual cart. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be internal to the P2P platform 1212 (e.g., the P2P platform 1212 offers a chat or messaging service that is within the payment application or accessible via the payment application). In some examples, the messaging application can be external to the P2P platform 1212. (e.g., the messaging application is hosted by a third-party service provider associated with the server(s) 1208, which can be accessible via one or more of the APIs 1218 or other integrations). The messaging application can include, for example, a text messaging application for communication between phones (e.g., conventional mobile telephones or smartphones), or a cross-platform instant messaging application for smartphones and phones that use the Internet for communication.

Funds received from payments can be stored in stored balances that are linked to, or otherwise associated with, user accounts. In some examples, the P2P platform 1212 can enable users 1216 to perform banking transactions via instances of the payment application 1226. For example, users can configure direct deposits, recurring deposits, or other deposits (e.g., tax refunds, loans, etc.) for adding assets to their various ledgers/balances. In some examples, users can deposit physical cash via ATMs or other deposit sources, which can include merchants, such as those merchants that utilize the payment processing system described above. In some examples, the P2P platform 1212 can enable users to allocate funds between different accounts, sub-accounts, or balances (e.g., spending, saving, different assets, different currencies), etc. Further, users 1216 can configure bill pay, recurring payments, and/or the like using assets associated with their accounts. In some examples, the P2P platform 1212, with consent of the user, can track individual transactions made using the payment application and can utilize such transaction data to make personalized or customized recommendations, determine creditworthiness, generate tax documentation, and/or the like.

In addition to sending and/or receiving assets via peer-to-peer transactions, the P2P platform 1212 enables users to buy and/or sell assets via asset networks such as cryptocurrency networks, securities networks, and/or the like. In some examples, acquisition of such assets can be in whole or fractional shares. The ledger system described below with reference to FIG. 13 can enable such assets to be acquired in fractional shares and/or in real-time or near real-time (by delaying or omitting the need to buy/sell assets via asset networks or exchanges). In some examples, users can "gift" assets to other users, for example, by transferring cryptocurrency, stocks, or the like to one another.

In some examples, the P2P platform 1212 can enable users to link payment instruments to their user accounts. As a result, users can use their linked payment instruments to access funds in their accounts or balances. In some examples, the payment instrument can be a credit card, debit card, card linked to multiple accounts or balances via software or hardware, a fob or other object having payment data stored thereon, or the like. In some examples, the payment instrument can be a virtual payment instrument or a physical payment instrument. In some examples, the virtual payment instrument can be issued in real-time or for temporary usage. In some examples, the virtual payment instrument can have the same or different payment data as a corresponding physical payment instrument. Payment instruments can be customizable using a design user interface of the payment application. Such customization can enable users to select colors, stamps, images, text, or the like for surface(s) of their payment instruments. In some examples, users can draw or otherwise interact with the design user interface to personalize surface(s) of their payment instruments.

In some examples, users can associate incentives with their payment instruments. Incentives can be recommended to users based on user preferences (inferred or explicitly identified), geolocation, propensity to redeem, value, and/or the like. In some examples, incentives can be particular to individual merchants, types of merchants, types of transactions, and/or the like. In at least one example, when a user uses their payment instrument at a merchant or type of merchant associated with an incentive, or for a transaction type associated with an incentive, the P2P platform 1212 can automatically apply the incentive to the transaction. In some examples, users can gift other users "gift cards" that can be associated with payment instruments. That is, a user can transfer an amount of funds to another user and such funds can be associated with a condition (e.g., merchant, merchant type, transaction type, location, etc.) that, upon satisfaction, enables the amount of funds, or a portion thereof, to be applied to a transaction. In at least one example, when a user uses their payment instrument for a transaction that satisfies the condition, the P2P platform 1212 can automatically apply the amount of funds associated with the gift card to the transaction.

In some examples, users can configure their account such that when they use their payment instruments, the P2P platform 1212 can deposit an amount of funds into a savings account, investing account, bitcoin account, or the like.

In some examples, users can search for or browse other users, merchants, items, or the like via the payment application. In some examples, search results can be personalized and/or customized for the user (e.g., based on user data collected with consent of the user). In some examples, users can shop or otherwise purchase items from other users, merchants, or the like from within the payment application or via a deep link to a merchant application or website.

The P2P platform 1212 can offer primary and secondary accounts, wherein a primary account is a sponsor or other delegate of one or more secondary accounts. Such accounts can be useful for families, wherein a parent or other guardian is a sponsor or delegate to one or more child accounts, or where a child is a sponsor or delegate of an elderly parent's account. In some examples, primary accounts can establish limits on secondary accounts, such as spending limits, or the like. In some examples, the primary account owner is the user legally responsible for the account and their identity may be verifiable for secondary user accounts to perform certain transactions, such as buying/selling cryptocurrency or stocks. In some examples, one or more primary accounts and one or more secondary accounts can form a "group" with shared goals, such as saving, investing, or the like.

The P2P platform 1212 can present activity data via an activity user interface of the payment application. In some examples, activity can be presented by merchant, date, time, amount, or the like. In some examples, interactions between entities can be represented in conversational communications such that each interaction or transaction is represented as a message. In some examples, users can interact with individual messages and/or send/request funds from within such a conversational communication. In some examples, such conversational communications can represent conversations of a group of two or more users.

Groups can be used to pool funds, obtain group discounts or incentives, or enable multiple users to participate in financial transactions together (e.g., group investing, group savings, etc.).

The P2P platform 1212 can offer a variety of financial training or learning opportunities. In some examples, such training or learning can be personalized for individual users, for example, based on user data and/or transaction data of the user that is obtained with consent of the user. In some examples, such user data and/or transaction data can be analyzed to make actionable recommendations with respect to optimizing financial health of users of the P2P platform 1212.

In some examples, components of the environment 1200 may be integrated to enable payments at the point-of-sale using assets associated with user accounts of the P2P platform 1212. As illustrated in the environment 1200, the components can communicate with one another via the network 1204, where one or more APIs 1218 or other functional components can be used to facilitate such communication.

In at least one example, an integration can enable a customer to participate in a transaction via their own computing device (e.g., user device 1206(B)) instead of interacting with a merchant device of a merchant, such as the seller device 1206(A). In such an example, the POS application 1220, associated with a payment processing platform and executable by the seller device 1206(A) of the merchant, can present a Quick Response (QR) code, or other code that can be used to identify a transaction (e.g., a transaction code), in association with a transaction between the customer and the merchant. The QR code, or other transaction code, can be provided to the POS application 1220 via an API 1218 associated with the peer-to-peer payment platform. In an example, the customer can utilize their own computing device, such as the user device 1206(B), to capture the QR code, or the other transaction code, and to provide an indication of the captured QR code, or other transaction code, to server(s) 1202.

Based at least in part on the integration of the peer-to-peer payment platform and the payment processing platform (e.g., via the API 1218), the server(s) 1202 of the seller platform 1210 can exchange communications with a payment application 1226 associated with the P2P platform 1212 and/or the POS application 1220 to process payment for the transaction using a peer-to-peer payment where the customer is a first "peer" and the merchant is a second "peer."

Based at least in part on receiving an indication of which payment method a user (e.g., customer or merchant) intends to use for a transaction, techniques described herein utilize an integration between the P2P platform 1212 and seller platform 1210 (which can be a first- or third-party integration) such that a QR code, or other transaction code, specific to the transaction can be used for providing transaction details, location details, customer details, or the like to a computing device of the customer, such as the user device 1206(B), to enable a contactless (peer-to-peer) payment for the transaction, and transferring funds from an account of the customer to an account of the merchant.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1206(B), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1220 and the payment application 1226, as described herein, can process a payment transaction by routing information input via the merchant application to the payment application for completing a "frictionless" payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. A customer computing device, such as the user device 1206(B), can be specially configured as a buyer-facing device having functionality similar to the functionality described above in the brick-and-mortar example.

In some examples, based at least in part on capturing the QR code, or other transaction code, the seller platform 1210 can provide transaction data to the P2P platform 1212 for presentation via the payment application 1226 on the computing device of the customer, such as the user device 1206B(B), to enable the customer to complete the transaction via their own computing device. In some examples, in response to receiving an indication that the QR code, or other transaction code, has been captured or otherwise interacted with via the customer computing device, the P2P platform 1212 can determine that the customer authorizes payment of the transaction using funds associated with a stored balance of the customer that is managed and/or maintained by the P2P platform 1212. Such authorization can be implicit such that the interaction with the transaction code can imply authorization of the customer. Alternatively or additionally, the P2P platform 1212 can request express authorization to process payment for the transaction using the funds associated with the stored balance and the customer can interact with the payment application to expressly authorize the settlement of the transaction. In some examples, such an authorization (implicit or express) can be provided prior to a transaction being complete and/or initialization of a conventional payment flow.

That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the P2P platform 1212 can transfer funds from the stored balance of the customer to the seller platform 1210. In at least one example, the seller platform 1210 can deposit the funds, or a portion thereof, into a stored balance of the merchant that is managed and/or maintained by the seller platform 1210. In such an example, the seller platform 1210 can be a "peer" to the customer in a peer-to-peer transaction.

In some examples, techniques described herein can enable the customer to interact with the transaction after payment for the transaction has been settled. For example, in at least one example, the seller platform 1210 can cause a total amount of a transaction to be presented via a user interface associated with the payment application 1226 such that the customer can provide gratuity, feedback, loyalty information, or the like, via an interaction with the user interface. In another example, the seller platform 1210 can adjust a total amount of a transaction based on events during a shopping experience, such as adding or removing a charge to the total amount based on whether a media content item requested by the customer to be played during a shopping experience was in fact played. In some examples, because the customer has already authorized payment via the P2P platform 1212, if the customer inputs a tip and/or an event affecting the total amount of the transaction is triggered, the P2P platform 1212 can transfer additional funds, associated with the tip or event, to the seller platform 1210. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction. Using the pre-authorization techniques described herein results in fewer data transmissions and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1226 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. In some examples, the payment instrument can be associated with the P2P platform 1212 as described herein (e.g., a debit card linked to a stored balance of a customer) such that when the payment instrument is caused to interact with a payment reader, the seller platform 1210 can exchange communications with the P2P platform 1212 to authorize payment for a transaction and/or provision associated transaction data to a computing device of the customer associated with the transaction.

Turning now to media content functionality provided by the environment 1200, the media content platform 1214 can provide digital media to a content consumption device 1206(D) where playback may occur using "streaming." In examples, "streaming" media content involves encoding the media content and transmitting the encoded media content over the network 1204 to a media player or a media application executing on a device (e.g., via a speaker). The device then decodes and plays the media content while data is being received. In some cases, a buffer queues some of the data of the media content (e.g., audio data, video data, etc.) ahead of the media being played. During moments of network congestion, which leads to lower available bandwidth, less media content data is added to the buffer, which drains down as media content is being dequeued during streaming playback. However, during moments of high network bandwidth, the buffer is replenished, adding media content data to the buffer.

In at least one example, the media content platform 1214 can provide a digital media streaming service (e.g., subscription-based, non-subscription-based) that enables a content consumption device 1206(D) to stream and/or download digital media content via a listener application 1228 installed on the content consumption device 1206(D). For instance, the media content platform 1214 may comprise a digital audio streaming service (e.g., for music, podcasts, audiobooks, etc.), a digital video streaming service, and/or a streaming service that provides streaming of various different types of digital media content or multimedia. In such cases where digital media content items are downloaded and stored locally on the content consumption devices 1206(D), the listener application 1228 may verify access rights to the digital media content items at time intervals, for instance intermittently (e.g., when the content consumption device 1206(D) has a network connection with the media content platform 1214 via the network(s) 1204), and/or at regular intervals (e.g., daily, weekly, monthly, etc.). In examples, access rights to the digital media content items may be provided when a subscription to the media content platform 1214 is active, while access rights to the digital media content items may be withheld when the subscription to the media content platform 1214 is terminated. Enabling storage on the end user devices 1206 and subsequent access to digital media content items via the listener application 1228 provides the users 1216 with the ability to access the digital media content items "offline" such as when a connection to the media content platform 1214 via the network(s) 1204 is unavailable or unreliable.

In some examples, the media content platform 1214 may additionally or alternatively provide an artist management service that enables the users 1216 to manage aspects of artist business via an artist application 1230 installed on the artist device 1206(E), such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some cases, the users 1216 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 1216 may have access to a single user account via respective end user devices 1206, with the various users having different access privileges to services provided by the artist management service. In various scenarios, an artist can designate functions provided by the artist management service to different members of the team associated with the artist, thus granting the respective team members access to services suited to the skills of the individual team members.

In some cases, the artist application 1230 and the listener application 1228 may be distinct applications having differing user experiences and verification processes for access, such as illustrated in the environment 1200. For instance, the media content platform 1214 may request additional verification, such as a link to an artist website, a sample of an artist's work, a verified credential supplied by a third party, etc. to grant access to the artist application 1230 in addition to information requested to access the listener application 1228. Further, the artist application 1230 may provide the artist management services described herein, without the subscription-based digital media streaming services described herein, and vice versa. However, examples are also considered in which functionality provided by the artist application 1230 and the listener application 1228 partially or fully overlap, and/or where verification processes for access are substantially similar.

In at least some examples, the media content platform 1214 enables interaction between the users 1216 utilizing the listener application 1228 installed on the content consumption devices 1206(D), and the users 1216 utilizing the artist application 1230 installed on the artist devices 1206

(E). For example, the media content platform 1214 may provide interconnectivity between the subscription-based digital media streaming service and the artist management service. Functionality provided by the media content platform 1214 in such instances may include a communication channel between one or more of the users 1216 (e.g., a listener, fan, music supervisor, publisher, etc.) utilizing the listener application 1228 and another user (e.g., an artist) of the users 1216 utilizing the artist application 1230. The communication channel may include, for instance, a messaging platform (also referred to as a "messaging application" herein), a live streaming platform, a videoconferencing or teleconferencing platform, and/or a combination of these.

Additionally, in some cases, the media content platform 1214 may facilitate a resource transfer between the listener application 1228 and the artist application 1230. In an example, the media content platform 1214 may direct a resource, such as a portion of a subscription fee paid by one of the users 1216 designated as a listener, to one or more of the users 1216 designated as artists based on a number of instances that the listening user consumed (e.g., streamed, downloaded, etc.) content created by respective ones of the artist users. Alternatively or additionally, the media content platform 1214 may direct a resource, such as funds, from an account associated with a listening user to an account associated with an artist user (or vice versa), in accordance with transfers between accounts as described herein. The media content platform 1214 may facilitate resource transfers in examples such as merchandise purchases, event ticket purchases, "tipping" an artist, payments for royalties or other fees, and so forth.

In some examples, the media content platform 1214 enables interaction between individual ones of the users 1216 with one another via the listener application 1228 installed on the content consumption device 1206(D) and other of the content consumption devices 1206(D) via a communication channel as described above. In an example, the listener application 1228 may provide functionality via a communication channel for a user to stream an individual digital media item, a playlist, or the like to an audience comprising other ones of the content consumption devices 1206(D). Alternatively or additionally, the communication channel may facilitate sharing of individual digital media items, playlists, user and/or artist profiles, and the like between the users 1216 via messages, uniform resource locators (URLs), quick response (QR) codes, and so forth.

In some cases, the media content platform 1214 enables interaction between individual ones of the users 1216 with one another via the artist application 1230 installed on the artist device 1206(E) and other of the artist devices 1206 via a communication channel as described above. In some instances, the media content platform 1214 may provide recommendations for a particular user indicating which of the other users 1216 to communicate with. Such a recommendation may be based on a similarity (or dissimilarity) of content created by two or more of the users 1216, an overlap (or lack thereof) of audience members of the users 1216, a geographic location of the users 1216, a coinciding event location of the users 1216, and so forth. In some examples, a user may input parameters for a desired connection via the artist application 1230, and the media content platform 1214 may filter which of the users 1216 to surface for recommendations to the user based on the input parameters. Alternatively or additionally, the media content platform 1214 may implement one or more machine learning models to filter which of the users 1216 to surface for recommendations to the user. The recommendations provided by the media content platform 1214 may be data driven and thus increase relevance of communications presented to the users 1216 and reduce unsolicited communications that may be received by the users 1216.

The media content platform 1214 may interact with the server(s) 1208 associated with the third-party service providers to, for instance, ingest digital media items, report digital media consumption data, pay royalties, and the like. In some examples, the server(s) 1208 may be accessible by the media content platform 1214 via one or more APIs 1218 or other integrations. In some cases, the third-party service provider may be a digital media content provider (e.g., a record label, a performance rights organization (PRO), an independent artist, etc.). In such cases, the media content platform 1214 may receive digital media content items from the server(s) 1208, along with metadata associated with the digital media content items. The metadata, in some instances, may indicate individual contributors to a digital media content item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata may indicate information such as release date, track title, track duration, clean or explicit version, jurisdiction information, and the like. The media content platform 1214 may use the metadata to associate the digital media content item as being created by a particular user, to provide search results to the users 1216, to generate playlists, and so forth. Further, the media content platform 1214 may provide payments (e.g., royalties) to the third-party service provider based on a number of streams and/or downloads of individual digital media content items by the users via the listener application 1228.

Techniques described herein are directed to services provided via a distributed system of end user devices 1206 that are in communication with server(s) 1202 of the service provider. That is, techniques described herein are directed to a specific implementation—or, a practical application—of utilizing a distributed system of end user devices 1206 that are in communication with server(s) 1202 of the seller platform 1210, the P2P platform 1212, and/or the media content platform 1214 to perform a variety of services, as described above. The unconventional configuration of the distributed system described herein enables the server(s) 1202 that are remotely-located from end-users (e.g., users 1216) to intelligently offer services based on aggregated data associated with the end-users, such as the users 1216 (e.g., data associated with multiple, different merchants and/or multiple, different buyers; data associated with multiple different listeners and/or multiple different artists, etc.), in some examples, in near-real time. Accordingly, techniques described herein are directed to a particular arrangement of elements that offer technical improvements over conventional techniques for performing payment processing services, P2P payment services, media content services, and the like. For small business owners and artists in particular, the business environment is typically fragmented and relies on unrelated tools and programs, making it difficult for an owner or an artist to manually consolidate and view such data. The techniques described herein constantly or periodically monitor disparate and distinct user accounts, e.g., accounts within the control of the seller platform 1210, the P2P platform 1212, and/or the media content platform 1214, and those outside of the control of these service providers, to track the standing (payables, receivables, payroll, invoices, appointments, capital, balances, collaborations, etc.) of the users 1216. The techniques herein provide a consolidated view of a user's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services, P2P payment services, media content services, and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1216 and end user devices 1206. Furthermore, such features are changed dynamically based on the profiles of the users involved interacting with the GUIs. As such, techniques described herein are directed to improvements to computing systems.

The seller platform 1210, the P2P platform 1212, and/or the media content platform 1214 are capable of providing additional or alternative services, and the services described above are offered as a sampling of services. In at least one example, the seller platform 1210, the P2P platform 1212, and/or the media content platform 1214 can exchange data with the server(s) 1208 associated with third-party service providers. Such third-party service providers can provide information that enables the seller platform 1210, the P2P platform 1212, and/or the media content platform 1214 to provide services, such as those described above. In additional or alternative examples, such third-party service providers can access services of the seller platform 1210, the P2P platform 1212, and/or the media content platform 1214. That is, in some examples, the third-party service providers can be subscribers, or otherwise access, services of the seller platform 1210, the P2P platform 1212, and/or the media content platform 1214.

FIG. 13 illustrates an example environment 1300 including a service provider system 1302 which may be associated with the server(s) 1202 of FIG. 12. The environment 1300 may also include a user device 1304, which may correspond to any of the end user devices 1206 described in relation to FIG. 12. In examples, the service provider system 1302 may include one or a combination of the seller platform 1210, the P2P platform 1212, or the media content platform 1214, as well as one or more data store(s) 1306 that can store assets in an asset storage 1308, as well as data in user account(s) 1310. In some examples, the environment 1300 may also include a public blockchain 1314, one or more nodes 1316, and/or a hardware wallet 1318. The service provider system 1302, the user device 1304, public blockchain 1314, the node(s) 1316, and the hardware wallet 1318 may be connected and able to communicate via one or more networks 1320, which may have the same or similar functionality described in relation to the network 1204 of FIG. 12.

In some examples, user account(s) 1310 can include merchant account(s), customer account(s), media content subscriber account(s), artist account(s), and so forth. In at least one example, the asset storage 1308 can be used to record whether individual assets are registered to a user account 1310. For example, the asset storage 1308 can include asset wallet(s) 1322 for storing records of assets owned by the service provider system 1302, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 1208 of FIG. 12 can be associated therewith.

The asset wallet 1322 can be associated with one or more addresses and can vary addresses used to acquire assets (e.g., from the asset network(s)) so that its holdings are represented under a variety of addresses on the asset network. In examples where the service provider system 1302 has holdings of cryptocurrency (e.g., in the asset wallet 1322), a user can acquire cryptocurrency directly from the service provider system 1302. In some examples, the service provider system 1302 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In some scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider system 1302 can provide the same or similar functionality for securities or other assets.

The asset storage 1308 may contain ledgers that store records of assignments of assets to users 1216. Specifically, the asset storage 1308 may include asset ledger 1324, fiat currency ledger 1326, and/or other ledger(s) 1328, which can be used to record transfers of assets between users 1216 and/or one or more third-parties (e.g., merchant network(s), payment card network(s), ACH network(s), equities network(s), the asset network, securities networks, etc.). In doing so, the asset storage 1308 can maintain a running balance of assets managed by the service provider system 1302. The ledger(s) of the asset storage 1308 can further indicate some of the running balance for individual ledger(s) stored in the asset storage 1308 are assigned or registered to one or more user account(s) 1310.

In at least one example, the asset storage 1308 can include transaction logs 1330, which can include, as transaction data, records of past transactions involving the service provider system 1302 and/or the user account 1310. In some examples, the data store(s) 1306 can store a private blockchain 1332. A private blockchain 1332 can function to record sender addresses, recipient addresses, public keys, values of cryptocurrency transferred, and/or can be used to verify ownership of cryptocurrency tokens to be transferred.

In some examples, the service provider system 1302 can record transactions involving cryptocurrency until the number of transactions has exceeded a determined limit (e.g., number of transactions, storage space allocation, etc.). Based at least in part on determining that the limit has been reached, the service provider system 1302 can publish the transactions in the private blockchain 1332 to the public blockchain 1314 (e.g., associated with the asset network), where miners can verify the transactions and record the transactions to blocks on the public blockchain 1314. In at least one example, the service provider system 1302 can participate as miner(s) at least for transactions to which the respective platform is a party to, to be posted to the public blockchain 1314.

In some cases, the data store(s) 1306 can store and/or manage multiple user accounts, an example of which is described in relation to the user account 1310. In at least one example, the user account 1310 can include user account data 1334, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1334 can include account activity 1336 and user wallet key(s) 1338. In some examples, the user wallet key(s) 1338 can include a public-private key-pair and a respective address associated with the asset network or other asset networks. In some examples, the user wallet key(s) 1338 may include one or more key pairs, which can be unique to the asset network or other asset networks.

In addition to the user account data 1334, the user account 1310 can include ledger(s) for account(s) managed by the service provider system 1302, for the user. For example, the user account 1310 may include an asset ledger 1324, a fiat currency ledger 1326, and/or one or more other ledgers 1328. The ledger(s) can indicate that a corresponding user utilizes the service provider system 1302 to manage corresponding accounts (e.g., a cryptocurrency account, a securities account, a fiat currency account, an artist account, etc.). It should be noted that in some examples, the ledger(s) can be logical ledger(s) and the data can be represented in a single database. In some examples, individual ones of the ledger(s), or portions thereof, can be maintained by the service provider system 1302.

In some examples, the asset ledger 1324 can store a balance for each of one or more cryptocurrencies (e.g., Bitcoin, Ethereum, Litecoin, etc.) registered to the user account 1310. In at least one example, the asset ledger 1324 can further record transactions of cryptocurrency assets associated with the user account 1310. For example, the user account 1310 can receive cryptocurrency from the asset network using the user wallet key(s) 1338. In some examples, the user wallet key(s) 1338 may be generated for the user upon request. User wallet key(s) 1338 can be requested by the user in order to send, exchange, or otherwise control the balance of cryptocurrency held by the service provider system 1302 (e.g., in the asset wallet 1322) and registered to the user. In some examples, the user wallet key(s) 1338 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider system 1302 and the value is credited as a balance in asset ledger 1324), by purchasing currency in the form associated with the account using currency in a different form (e.g., buying a value of cryptocurrency from the service provider system 1302 using a value of fiat currency reflected in fiat currency ledger 1326, and crediting the value of cryptocurrency in asset ledger 1324), or by conducting a transaction with another user (customer or merchant) of the service provider system 1302 wherein the account receives incoming currency (which can be in the form associated with the account or a different form, in which the incoming currency may be converted to the form associated with the account).

With specific reference to funding a cryptocurrency account, a user may have a balance of cryptocurrency stored in another cryptocurrency wallet. In some examples, the other cryptocurrency wallet can be associated with a third-party unrelated to the service provider system 1302 (i.e., an external account). Such a transaction can request that the user to transfer an amount of the cryptocurrency in a message signed by user's private key to an address provided by the service provider system 1302. In at least one example, the transaction can be sent to miners to bundle the transaction into a block of transactions and to verify the authenticity of the transactions in the block. Once a miner has verified the block, the block is written to the public blockchain 1314 where the service provider system 1302 can then verify that the transaction has been confirmed and can credit the user's asset ledger 1324 with the transferred amount. When an account is funded by transferring cryptocurrency from a third-party cryptocurrency wallet, an update can be made to the public blockchain 1314. In some cases, this update of the public blockchain 1314 need not take place at a time-critical moment, such as when a transaction is being processed by a merchant in store or online.

In some examples, a user can purchase cryptocurrency to fund their cryptocurrency account. In some examples, the user can purchase cryptocurrency through services offered by the service provider system 1302. As described above, in some examples, the service provider system 1302 can acquire cryptocurrency from a third-party source. In examples where the service provider system 1302 has its own cryptocurrency assets, cryptocurrency transferred in a transaction (e.g., data with address provided for receipt of transaction and a balance of cryptocurrency transferred in the transaction) can be stored in an asset wallet 1322 associated with the service provider system 1302. In at least one example, the service provider system 1302 can credit the asset ledger 1324 of the user. Additionally, while the service provider system 1302 recognizes that the user retains the value of the transferred cryptocurrency through crediting the asset ledger 1324, an inspection of the blockchain will show the cryptocurrency as having been transferred to the service provider system 1302. In some examples, the asset wallet 1322 can be associated with many different addresses. In such examples, an inspection of the blockchain may not necessarily associate all cryptocurrency stored in asset wallet 1322 as belonging to the same entity. The presence of a private ledger used for real-time transactions and maintained by the service provider system 1302, combined with updates to the public ledger at other times, allows for extremely fast transactions using cryptocurrency to be achieved. In some examples, the "private ledger" can refer to the asset ledger 1324, which in some examples, can utilize the private blockchain 1332, as described herein. The "public ledger" can correspond to the public blockchain 1314 associated with the asset network.

In at least one example, an asset ledger 1324, fiat currency ledger 1326, or the like associated with the user account 1310 can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1324. In some examples, a user can receive fiat currency or another currency in the form of payment for a transaction with another user. In at least one example, at least a portion of such funds can be converted into cryptocurrency by the service provider system 1302 and used to fund the asset ledger 1324 of the user.

In examples, a user can also have an account in U.S. dollars, which can be tracked, for example, via the fiat currency ledger 1326. Such an account can be funded by transferring money from a bank account at a third-party bank to an account maintained by the service provider system 1302 as is conventionally known. In some examples, a user can receive fiat currency in the form of payment for a transaction with another user. In such examples, at least a portion of such funds can be used to fund the fiat currency ledger 1326.

In some examples, a user can have one or more internal payment cards registered with the service provider system 1302. Internal payment cards can be linked to one or more of the accounts associated with the user account 1310. In some embodiments, options with respect to internal payment cards can be adjusted and managed using an application (e.g., the payment application 1226, a wallet application 1312, etc.).

In at least one example, the user account 1310 can be associated with the asset wallet accessible via a wallet application 1312 of the user device 1304, or a stored balance for use in payment transactions, peer-to-peer transactions, payroll payments, etc. In at least one example, the asset wallet 1322 can store data indicating an address provided for receipt of a cryptocurrency transaction. In at least one example, the balance of the asset wallet 1322 can be based at least in part on a balance of the asset ledger 1324. In at least one example, funds availed via the asset wallet 1322 can be stored in the asset wallet 1322. Funds availed via the asset wallet 1322 can be tracked via the asset ledger 1324. The asset wallet 1322, however, can be associated with additional cryptocurrency funds.

In at least one example, when the service provider system 1302 includes a private blockchain 1332 for recording and validating cryptocurrency transactions, the asset wallet 1322 can be used instead of, or in addition to, the asset ledger 1324. For example, a merchant can provide the address of the asset wallet 1322 for receiving payments. In an example where a customer is paying in cryptocurrency and the customer has their own cryptocurrency wallet account associated with the service provider system 1302, the customer can send a message signed by its private key including its wallet address (i.e., of the customer) and identifying the cryptocurrency and value to be transferred to the merchant's asset wallet 1322. The service provider system 1302 can complete the transaction by reducing the cryptocurrency balance in the customer's cryptocurrency wallet and increasing the cryptocurrency balance in the merchant's asset wallet 1322. In addition to recording the transaction in the respective cryptocurrency wallets, the transaction can be recorded in the private blockchain 1332 and the transaction can be confirmed. A user can perform a similar transaction with cryptocurrency in a peer-to-peer transaction as described above.

While the asset ledger 1324 and/or asset wallet 1322 are each described above with reference to cryptocurrency, the asset ledger 1324 and/or asset wallet 1322 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider system 1302 is an aspect of the technology disclosed that enables technical advantages of increased processing speed and improved security.

The description of the environment 1300 above generally relates to a centralized service provider that at least partially facilitates storing and managing assets in the data store 1306. However, the environment 1300 may also facilitate decentralized storage and management of assets alternatively or in addition to centralized storage and management as described above. For instance, the environment 1300 may include a decentralized platform implemented using a plurality of nodes (e.g., web nodes), an example of which is illustrated as node 1316. The node 1316 is representative of a computer or other device tasked with validating transactions and/or maintaining a copy of a blockchain ledger, such as a ledger associated with the public blockchain 1314. The decentralized platform may be implemented via the environment 1300 through use of decentralized identifiers and verifiable credentials that are stored and managed by user devices 1304. A decentralized identifier is configured as a self-owned identifier that supports decentralized authentication and routing. A self-owned identifier in a blockchain network is a unique identifier that is owned and controlled by an individual entity on the blockchain, as contrasted with an entity controlled by a centralized authority (e.g., the service provider system 1302). The decentralized identity referenced by a decentralized identifier gives an entity control over what data can be accessed, stored, modified, and so forth by other entities, such as the service provider system 1302.

The node 1316, as representative of one of a plurality of decentralized nodes (e.g., decentralized web nodes), supports data storage and relays that allows entities, service provider systems, individuals, organizations and so forth to send, store, and receive encrypted or public messages and data. The node 1316 is universally addressable and is "crawlable" using data addressing in relation to the decentralized identifiers. The node 1316 is also configured to support decentralized replication of data across the nodes that is consistent across multiple nodes over time through continued data communication between the nodes in the decentralized platform. The node 1316 is configurable to support secure encryption through use of a cryptographic key associated with an individual's decentralized identifier and support semantic discovery to discover different forms of published data.

Verifiable credentials are an open standard for digital credentials, and employ a data format for cryptographic presentation and verification of claims. A verifiable credential represents an indication of trust of a piece of information related to an entity. For example, a verifiable credential indicates that the issuer of the verifiable credential trusts the holder of the verifiable credential; the holder trusts a verifier of the verifiable credential; and that the verifier trusts the issuer. Verifiable credentials may be issued by anyone, about anything, and can be presented to and verified by everyone granted access to the verifiable credential. Accordingly, a user of the user device 1304 may be an issuer, a holder, and/or a verifier, as can the service provider system 1302.

In some examples, the user device 1304 may implement a wallet application 1312 configured to manage decentralized identifiers and/or verifiable credentials. For instance, the wallet application 1312 may provide a user interface for implementation of access controls to various data associated with the decentralized identifier by the service provider system 1302, to other user devices, and so forth. Additionally, the wallet application 1312 may be configured to provide functionality for resource transfers (e.g., cryptocurrency, fiat currency, etc.) with the service provider system 1302, other user devices, and the like, based on techniques described herein.

In some examples, the hardware wallet 1318 may store cryptocurrency assets in combination with the wallet application 1312 and the service provider system 1302. For instance, the hardware wallet 1318, the wallet application 1312, and the service provider system 1302 may each store a respective, different private key, where a transaction with the cryptocurrency assets is signed by at least two of the three private keys. The user interface provided by the wallet application 1312 may allow a user to request a transaction. The wallet application 1312 may then sign the transaction with the private key of the wallet application 1312, have either the hardware wallet 1318 or the service provider system 1302 use a second of the three private keys to sign the transaction, and then provide the transaction with two signatures to the public blockchain 1314 for processing.

Figure 14:
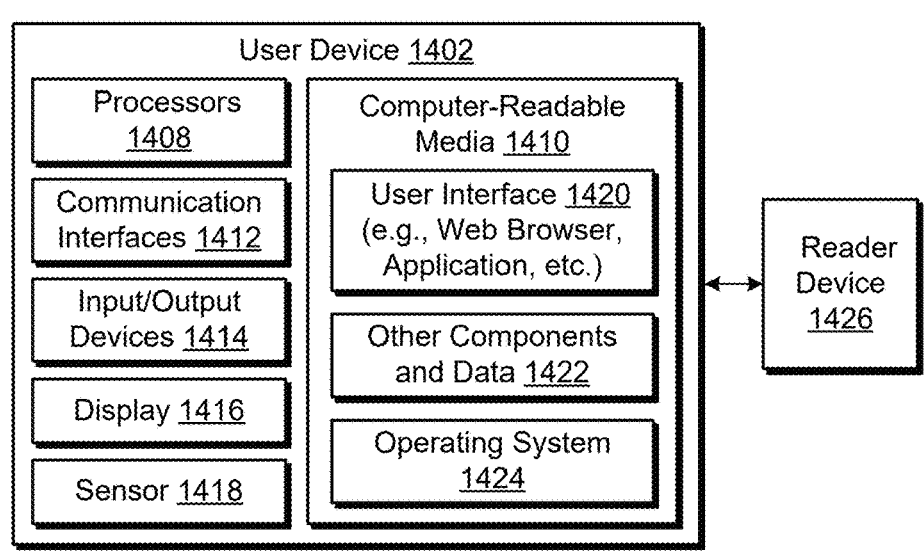
FIG. 14 is a non-limiting example illustrating an environment in which recommendation techniques described herein are performed in accordance with one or more implementations.

FIG. 14 depicts an illustrative block diagram illustrating a system 1400 for performing techniques described herein. The system 1400 includes a user device 1402, that communicates with server computing device(s) (e.g., server(s) 1404) via network(s) 1406 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1402 is illustrated, in additional or alternate examples, the system 1400 can have multiple user devices, as described above with reference to FIG. 12.

In at least one example, the user device 1402 (e.g., client device 106) can be any suitable type of computing device, e.g., portable, semi-portable, semi-stationary, or stationary. Some examples of the user device 1402 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 1402 can be any computing device capable of sending communications and performing the functions according to the techniques described herein. The user device 1402 can include devices, e.g., payment card readers, or components capable of accepting payments, as described below. The user device 1402 may be representative of, and provide functionality for, the user devices 1206 described in relation to FIG. 12.

In the illustrated example, the user device 1402 includes one or more processors 1408, one or more computer-readable media 1410, one or more communication interface(s) 1412, one or more input/output (I/O) devices 1414, a display 1416, and sensor(s) 1418. The user device 1402 is also configurable to include one or more encoders and one or more decoders.

In at least one example, each processor 1408 can itself comprise one or more processors or processing cores. For example, the processor(s) 1408 can be implemented as one or more microprocessors, microcomputers, microcontrollers, digital signal processors, central processing units, state machines, logic circuitries, and/or any devices that manipulate signals based on operational instructions. In some examples, the processor(s) 1408 can be one or more hardware processors and/or logic circuits of any suitable type specifically programmed or configured to execute the algorithms and processes described herein. The processor(s) 1408 can be configured to fetch and execute computer-readable processor-executable instructions stored in the computer-readable media 1410.

Depending on the configuration of the user device 1402, the computer-readable media 1410 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1410 can include, but is not limited to, RAM, ROM, EEPROM, flash memory, solid-state storage, magnetic disk storage, optical storage, and/or other computer-readable media technology. Further, in some examples, the user device 1402 can access external storage, such as RAID storage systems, storage arrays, network attached storage, storage area networks, cloud storage, or any other medium that can be used to store information and that can be accessed by the processor(s) 1408 directly or through another computing device or network. Accordingly, the computer-readable media 1410 can be computer storage media able to store instructions, components or components that can be executed by the processor(s) 1408. Further, when mentioned, non-transitory computer-readable media exclude media such as energy, carrier signals, electromagnetic waves, and signals per se.

The computer-readable media 1410 can be used to store and maintain any number of functional components that are executable by the processor(s) 1408. In some implementations, these functional components comprise instructions or programs that are executable by the processor(s) 1408 and that, when executed, implement operational logic for performing the actions and services attributed above to the user device 1402. Functional components stored in the computer-readable media 1410 can include a user interface 1420 to enable users to interact with the user device 1402, and thus the server(s) 1404 and/or other networked devices. In at least one example, a user can interact with the user interface (e.g., user interface 402, user interface 608, user interface 802) via touch input, spoken input, gesture, or any other type of input. The word "input" is also used to describe "contextual" input that may not be directly provided by the user via the user interface 1420. For example, user's interactions with the user interface 1420 are analyzed using, e.g., natural language processing techniques, user movement tracking techniques, eye tracking techniques, etc. to determine context or intent of the user, which may be treated in a manner similar to "direct" user input.

Depending on the type of the user device 1402, the computer-readable media 1410 can also optionally include other functional components and data, such as other components and data 1422, which can include programs, drivers, etc., and the data used or generated by the functional components. In addition, the computer-readable media 1410 can also store data, data structures and the like, that are used by the functional components. Further, the user device 1402 can include many other logical, programmatic and physical components, of which those described are merely examples that are related to the discussion herein.

In at least one example, the computer-readable media 1410 can include additional functional components, such as an operating system 1424 for controlling and managing various functions of the user device 1402 and for enabling user interactions.

The communication interface(s) 1412 can include one or more interfaces and hardware components for enabling communication with various other devices, such as over the network(s) 1406 or directly. For example, communication interface(s) 1412 can enable communication through one or more network(s) 1406, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1402 can further include one or more input/output (I/O) devices 1414. The I/O devices 1414 can include speakers, a microphone, a camera, and various user controls (e.g., buttons, a joystick, a keyboard, a keypad, etc.), a haptic output device, and so forth. The I/O devices 1414 can also include attachments that leverage the accessories (audio-jack, USB-C, Bluetooth, etc.) to connect with the user device 1402.

In at least one example, user device 1402 can include a display 1416. Depending on the type of computing device(s) used as the user device 1402, the display 1416 can employ any suitable display technology. For example, the display 1416 can be a liquid crystal display, a plasma display, a light emitting diode display, an OLED (organic light-emitting diode) display, an electronic paper display, or any other suitable type of display able to present digital content thereon. In at least one example, the display 1416 can be an augmented reality display, a virtual reality display, or any other display able to present and/or project digital content. In some examples, the display 1416 can have a touch sensor associated with the display 1416 to provide a touchscreen display configured to receive touch inputs for enabling interaction with a graphic interface presented on the display 1416. Accordingly, implementations herein are not limited to any particular display technology. In some examples, the user device 1402 may not include the display 1416, and information can be presented by other means, such as aurally, haptically, etc.

In addition, the user device 1402 can include sensor(s) 1418. The sensor(s) 1418 can include a global positioning system ("GPS") device able to indicate location information. Further, the sensor(s) 1418 can include, but are not limited to, an accelerometer, gyroscope, compass, proximity sensor, camera, microphone, and/or a switch.

In some examples, the GPS device can be used to identify a location of a user. In at least one example, the location of the user can be used by the seller platform 1210, the P2P platform 1212, and/or the media content platform 1214, described above, to provide one or more services. That is, in some examples, the service provider can implement geofencing to provide particular services to users by the seller platform 1210, the P2P platform 1212, and/or the media content platform 1214.

In examples, the user device 1402 includes a codec system, which may comprise an encoder and/or a decoder. The encoder is configured to encode a data stream or signal from an analog signal (e.g., an analog audio signal, an analog video signal, etc.) to a digital signal for transmission or storage. The decoder is configured to convert the digital signal back to an analog signal, such as for playback or editing. In some cases, the encoder may be configured to encode the data stream or analog signal in an encrypted format, and the decoder may accordingly be configured to decrypt the digital signal as part of the decoding process (e.g., using a cryptographic key). Additionally, in some examples, the encoder may compress data to reduce transmission bandwidth and/or storage space for the digital signal. One example of a compression codec system is a lossless codec, in which the digital data stream is a compressed format of the original data stream, but retains the information present in the original data stream. Another example of a compression codec system is a lossy codec which reduces the quality of the digital data stream but can increase the compression of the data stream relative to lossless codec systems. The codec system comprising the encoder and/or the decoder may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1400, the server 1404 may include an encoder and/or a decoder as well.

Additionally, the user device 1402 can include various other components that are not shown, examples of which include removable storage, a power source, such as a battery and power control unit, a barcode scanner, a printer, a cash drawer, and so forth.

In addition, as described in relation to FIG. 12, the user device 1402 can include, be connectable to, or otherwise be coupled to a reader device 1426, for reading payment instruments and/or identifiers associated with payment objects. The reader device 1426 can include a read head for reading a magnetic strip of a payment card, and further can include encryption technology for encrypting the information read from the magnetic strip. Additionally or alternatively, the reader device 1426 can be an EMV payment reader, which in some examples, can be embedded in the user device 1402. Moreover, numerous other types of readers can be employed with the user device 1402 herein, depending on the type and configuration of the user device 1402.

The reader device 1426 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data from various types of payment instruments. Accordingly, the reader device 1426 may include hardware implementation, such as slots, magnetic tracks, and rails with one or more sensors or electrical contacts to facilitate detection and acceptance of a payment instrument. That is, the reader device 1426 may include hardware implementations to enable the reader device 1426 to interact with a payment instrument via a swipe, a dip, or a tap to obtain payment data associated with a customer. Additionally or optionally, the reader device 1426 may also include a biometric sensor to receive and process biometric characteristics and process them as payment instruments, given that such biometric characteristics are registered with the payment service and connected to a financial account with a bank server. The reader device 1426 may include processing unit(s), computer-readable media, a reader chip, a transaction chip, a timer, a clock, a network interface, a power supply, and so on. That is, the reader device 1426 may include any of the computing components described herein with reference to the user device 1402 to implement the functionality provided by the reader device 1426.

In examples, the reader device 1426 includes a reader chip, which may perform functionality to control the power supply, among other functionality of the reader device 1426. The power supply may include one or more power supplies such as a physical connection to AC power or a battery. Power supply may include power conversion circuitry for converting AC power and generating a plurality of DC voltages for use by components of reader device 1426. When power supply includes a battery, the battery may be charged via a physical power connection, via inductive charging, or via any other suitable method.

The reader device 1426 may also include a transaction chip that may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1402, which can be a POS terminal, and the reader device 1426 are shown as separate devices, in additional or alternative examples, the user device 1402 and the reader device 1426 can be part of a single device, which may be a battery-operated device. In some examples, the reader device 1426 can have a display integrated therewith, which can be in addition to (or as an alternative of) the display 1416 associated with the user device 1402.

The server(s) 1404 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1404 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1404 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1404 can include one or more processors 1428, one or more computer-readable media 1430, one or more I/O devices 1432, and one or more communication interfaces 1434. Each processor 1428 can be a single processing unit or a number of processing units and can include single or multiple computing units or multiple processing cores. The processor(s) 1428 can be implemented as one or more microprocessors, microcomputers, microcontrollers, digital signal processors, central processing units, state machines, logic circuitries, and/or any devices that manipulate signals based on operational instructions. For example, the processor(s) 1428 can be one or more hardware processors and/or logic circuits of any suitable type specifically programmed or configured to execute the algorithms and processes described herein. The processor(s) 1428 can be configured to fetch and execute computer-readable instructions stored in the computer-readable media 1430, which can program the processor(s) 1428 to perform the functions described herein.

The computer-readable media 1430 can include volatile and nonvolatile memory and/or removable and non-removable media implemented in any type of technology for storage of information, such as computer-readable instructions, data structures, program components, or other data. Such computer-readable media 1430 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1404, the computer-readable media 1430 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1430 can be used to store any number of functional components that are executable by the processor(s) 1428. In many implementations, these functional components comprise instructions or programs that are executable by the processors 1428 and that, when executed, specifically configure the one or more processors 1428 to perform the actions attributed above to the seller platform 1210, the P2P platform 1212, and/or the media content platform 1214. Functional components stored in the computer-readable media 1430 can optionally include a merchant component 1436, a training component 1438, and one or more other components and data 1440. The computer-readable media 1430 can additionally include an operating system 1442 for controlling and managing various functions of the server(s) 1404.

The merchant component 1436 can be configured to receive transaction data from POS systems, such as the POS system 1224 described above with reference to FIG. 12. The merchant component 1436 can transmit requests (e.g., authorization, capture, settlement, etc.) to payment service server computing device(s) to facilitate POS transactions between merchants and customers. The merchant component 1436 can communicate the successes or failures of the POS transactions to the POS systems.

The training component 1438 can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1402 and/or the server(s) 1404 for use at a time after the data models have been trained (e.g., at runtime).

The one or more other components and data 1440 can include functionality of which is described above. Further, the one or more other components and data 1440 can include programs, drivers, etc., and the data used or generated by the functional components. Further, the server(s) 1404 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The communication interface(s) 1434 can include one or more interfaces and hardware components for enabling communication with various other devices, such as over the network(s) 1406 or directly. For example, communication interface(s) 1434 can enable communication through one or more network(s) 1406, which can include, but are not limited any type of network known in the art, as described herein.

The server(s) 1404 can further be equipped with various I/O devices 1432. Such I/O devices 1432 can include a display, various user interface controls (e.g., buttons, joystick, keyboard, mouse, touch screen, biometric or sensory input devices, etc.), audio speakers, connection ports and so forth.

In at least one example, the system 1400 can include a datastore 1444 that can be configured to store data that is accessible, manageable, and updatable. In some examples, the datastore 1444 can be integrated with the user device 1402 and/or the server(s) 1404. In other examples, as shown in FIG. 14, the datastore 1444 can be located remotely from the server(s) 1404 and can be accessible to the server(s) 1404. The datastore 1444 can comprise multiple databases and/or servers connected locally and/or remotely via the network(s) 1406. In at least one example, the datastore 1444 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1444 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1444 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention and may be included in more than one example of the present invention.

In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention.

In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:

exposing, by a service provider system, a software development kit having functionality to generate gating logic that is executable to control access to a digital service;

receiving, via a user interface exposed by the software development kit, inputs defining the digital service and criteria to be used to control access to the digital service;

generating the gating logic based on the inputs using a machine-learning model as implemented using generative artificial intelligence, wherein the gating logic comprises one or more authorization operations;

executing the gating logic in conjunction with the digital service;

receiving a query to access the digital service from a client device of a user;

communicating a request to the client device for a verifiable credential of the user based on the gating logic;

receiving a response to the request that includes the verifiable credential as signed by a decentralized identifier associated with the user and issued by a credential issuer;

identifying, based on the gating logic, whether the verifiable credential comprises static credential data or dynamic credential data;

verifying that the verifiable credential complies with the gating logic through interaction with the credential issuer, the verifying comprising, for static credential data, performing one or more of the authorization operations to verify with the credential issuer that the static credential data is not expired for the user, and for dynamic credential data, performing one or more of the authorization operations to verify with the credential issuer that the dynamic credential data is not revoked for the user; and responsive to verifying compliance of the verifiable credential, permitting access by the client device of the user to the digital service.

2. The method as described in claim 1, wherein the digital service is implemented at a decentralized node of a plurality of decentralized nodes that implement a decentralized platform.

3. The method as described in claim 2, wherein the digital service is implemented at a personal datastore maintained at the decentralized node that is located using the query by a decentralized identifier of an entity that provides the digital service.

4. The method as described in claim 1, wherein the generating the gating logic based on the inputs using the machine-learning model as implemented using the generative artificial intelligence includes generating one or more rules.

5. The method as described in claim 4, wherein the one or more rules generated using the machine-learning model as implemented using the generative artificial intelligence define access to a respective application programming interface of a plurality of application programming interfaces.

6. The method as described in claim 5, wherein the verifiable credential is usable to access digital content via the respective application programming interface.

7. The method as described in claim 1, wherein verifying that the verifiable credential complies with the gating logic is further based on the decentralized identifier associated with the user.

8. The method as described in claim 1, wherein the verifiable credential further includes a cryptographic proof usable to verify the verifiable credential.

9. The method as described in claim 1, wherein the verifiable credential verifies a claim made by a corresponding entity.

10. A computing device comprising:
a processing device; and
a computer-readable storage medium storing instructions that, responsive to execution by the processing device, cause the processing device to perform operations including:
   detecting a request in a header of a webpage, the request for a verifiable credential to obtain access to the webpage;
   identifying, through execution of gating logic by the processing device automatically and without user intervention, which verifiable credential of a plurality of verifiable credentials is referenced in the request, wherein the gating logic comprises one or more authorization operations generated using generative artificial intelligence;
   identifying, based on the gating logic, whether the verifiable credential comprises static credential data or dynamic credential data;
   for static credential data, performing one or more of the authorization operations to verify with a credential issuer that the static credential data is not expired for a user of the verifiable credential, and for dynamic credential data, performing one or more of the authorization operations to verify with the credential issuer that the dynamic credential data is not revoked for the user;
   in response to the static credential data being verified as not expired or the dynamic credential data being verified as not revoked, determining, through local execution of the gating logic by the processing device, that access to the verifiable credential is permitted;
   communicating the verifiable credential responsive to the determining, wherein the verifiable credential is signed by a decentralized identifier associated with the user and issued by the credential issuer; and
   receiving access to the webpage responsive to successful verification of the verifiable credential.

11. The computing device as described in claim 10, wherein the identifying which verifiable credential of the plurality of verifiable credentials is referenced in the request and the determining are performed through execution of a plugin module by a browser executed by the processing device.

12. The computing device as described in claim 10, wherein the detecting, the determining, the communicating, and the receiving are performed automatically and without user intervention.

13. The computing device as described in claim 10, wherein the verifiable credential includes a cryptographic proof usable to verify authenticity of the verifiable credential and verifies a claim made by a corresponding entity.

14. The computing device as described in claim 10, wherein the receiving access includes initiating a download of content associated with the webpage or granting access to content included as part of the webpage.

15. A method comprising:
displaying, by a processing device, a user interface configured to generate gating logic to control access;
receiving, by the processing device, inputs defining access control rules to be implemented using a verifiable credential to control access to a personal datastore;
identifying, by the processing device based on the inputs, whether the verifiable credential comprises static credential data or dynamic credential data;
generating, by the processing device, gating logic usable to implement the access control rules, the gating logic comprising one or more authorization operations generated using generative artificial intelligence, wherein for the static credential data, the authorization operations are configured to verify with a credential issuer that the static credential data is not expired for a user of the verifiable credential, and for dynamic credential data, the authorization operations are configured to verify with the credential issuer that the dynamic credential data is not revoked for the user; and transmitting, by the processing device, the gating logic for implementation by a select decentralized node of a plurality of decentralized nodes of a decentralized network, the gating logic configured to control access to the personal datastore based on the verifiable credential, wherein the verifiable credential is signed by a decentralized identifier associated with the user and issued by the credential issuer.

16. The method as described in claim 15, further comprising receiving a software development kit and wherein the displaying, the receiving, the generating, and the transmitting are performed through execution of the software development kit by the processing device.

17. The method as described in claim 15, wherein the generating is performed utilizing the generative artificial intelligence which is implemented using a machine-learning model.

18. The method as described in claim 17, wherein the verifiable credential is verifiable to verify the credential issuer of the verifiable credential.

19. The method as described in claim 15, wherein the personal datastore is locatable on the select decentralized node of the plurality of decentralized nodes of the decentralized network using a decentralized identifier of an entity associated with the personal datastore.

20. The method as described in claim 15, wherein the access control rules control access to digital content maintained in the personal datastore.

* * * * *